United States Patent
Xiao et al.

(10) Patent No.: US 8,970,699 B2
(45) Date of Patent: Mar. 3, 2015

(54) METHODS AND SYSTEMS FOR AUTOMOBILE SECURITY MONITORING

(75) Inventors: Hong Xiao, Acton, MA (US); Afshin Moshrefi, Newburyport, MA (US); Andre Turner, Belmont, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 646 days.

(21) Appl. No.: 12/975,658

(22) Filed: Dec. 22, 2010

(65) Prior Publication Data

US 2012/0162423 A1 Jun. 28, 2012

(51) Int. Cl.
*H04N 9/47* (2006.01)
*B60R 25/31* (2013.01)
*H04N 7/18* (2006.01)
*B60R 1/08* (2006.01)
*B60R 1/00* (2006.01)
*B60R 25/30* (2013.01)
*G07C 5/00* (2006.01)

(52) U.S. Cl.
CPC ............... *B60R 25/31* (2013.01); *H04N 7/181* (2013.01); *B60R 1/08* (2013.01); *H04N 7/18* (2013.01); *B60R 1/00* (2013.01); *B60R 25/305* (2013.01); *G07C 5/008* (2013.01)
USPC ........... 348/148; 348/143; 348/152; 348/153; 348/154

(58) Field of Classification Search
USPC .................................. 348/148, 143, 152–154
See application file for complete search history.

(56) References Cited

U.S. PATENT DOCUMENTS

| | | | | |
|---|---|---|---|---|
| 4,897,630 A * | 1/1990 | Nykerk | ..................... | 340/426.25 |
| 6,873,261 B2 * | 3/2005 | Anthony et al. | ............... | 340/574 |
| 7,092,802 B2 * | 8/2006 | Baldassa | ......................... | 701/24 |
| 7,460,020 B2 * | 12/2008 | Reyes et al. | ................. | 340/573.1 |
| 2009/0066488 A1 * | 3/2009 | Qiahe et al. | ................. | 340/426.1 |
| 2011/0096149 A1 * | 4/2011 | Au et al. | .......................... | 348/47 |

* cited by examiner

*Primary Examiner* — Geepy Pe

(57) ABSTRACT

In one embodiment, a method for monitoring the security of a plurality of automobiles includes receiving a message indicating a potential security threat to an automobile, and sending, over a network to a terminal device associated with an owner of the automobile, an alert indicating the potential security threat to the automobile. The method may further include one or more of: streaming video from a security camera onboard the automobile, streaming video from a public security camera near the automobile, or sending a report to a law enforcement entity.

14 Claims, 11 Drawing Sheets

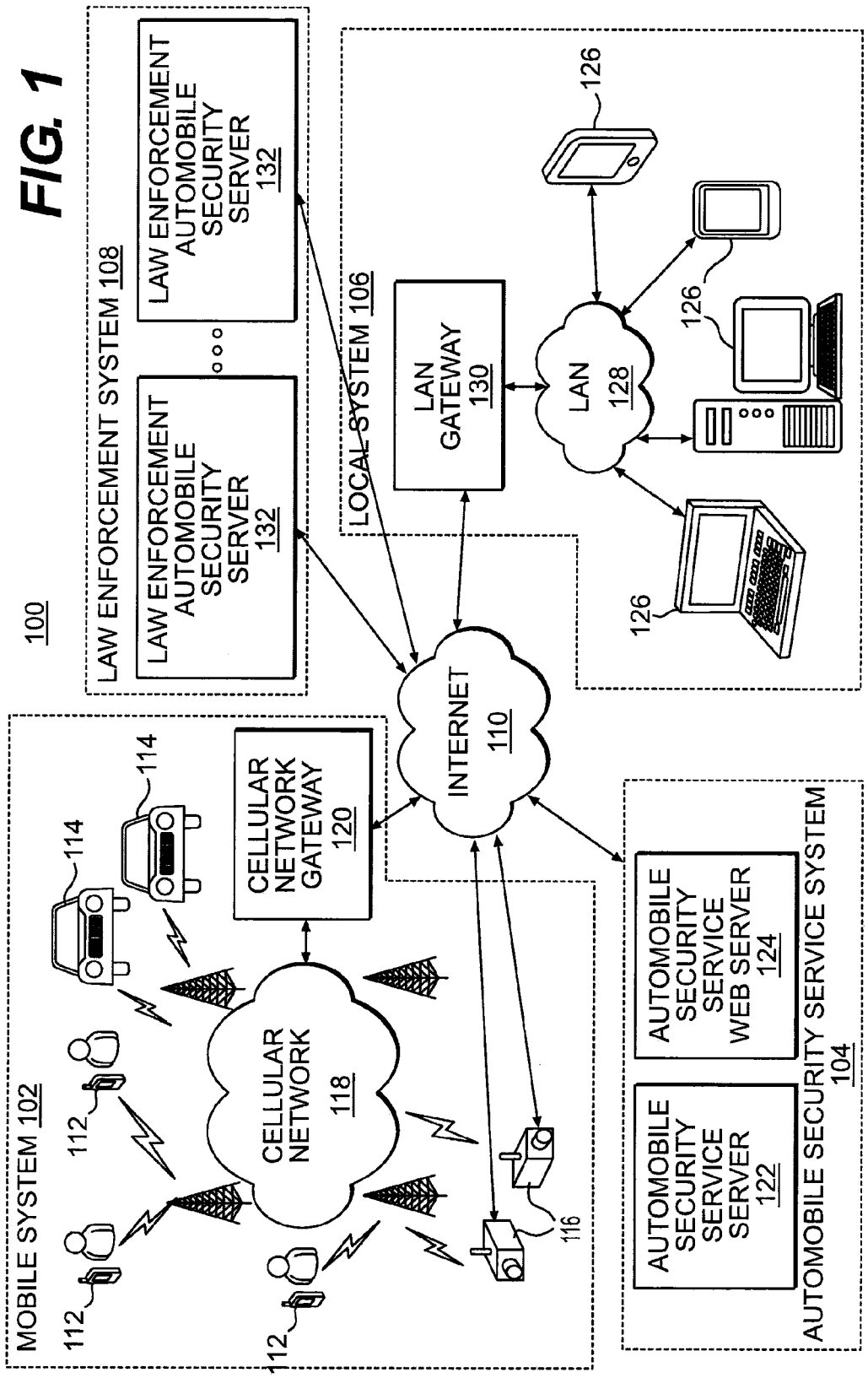

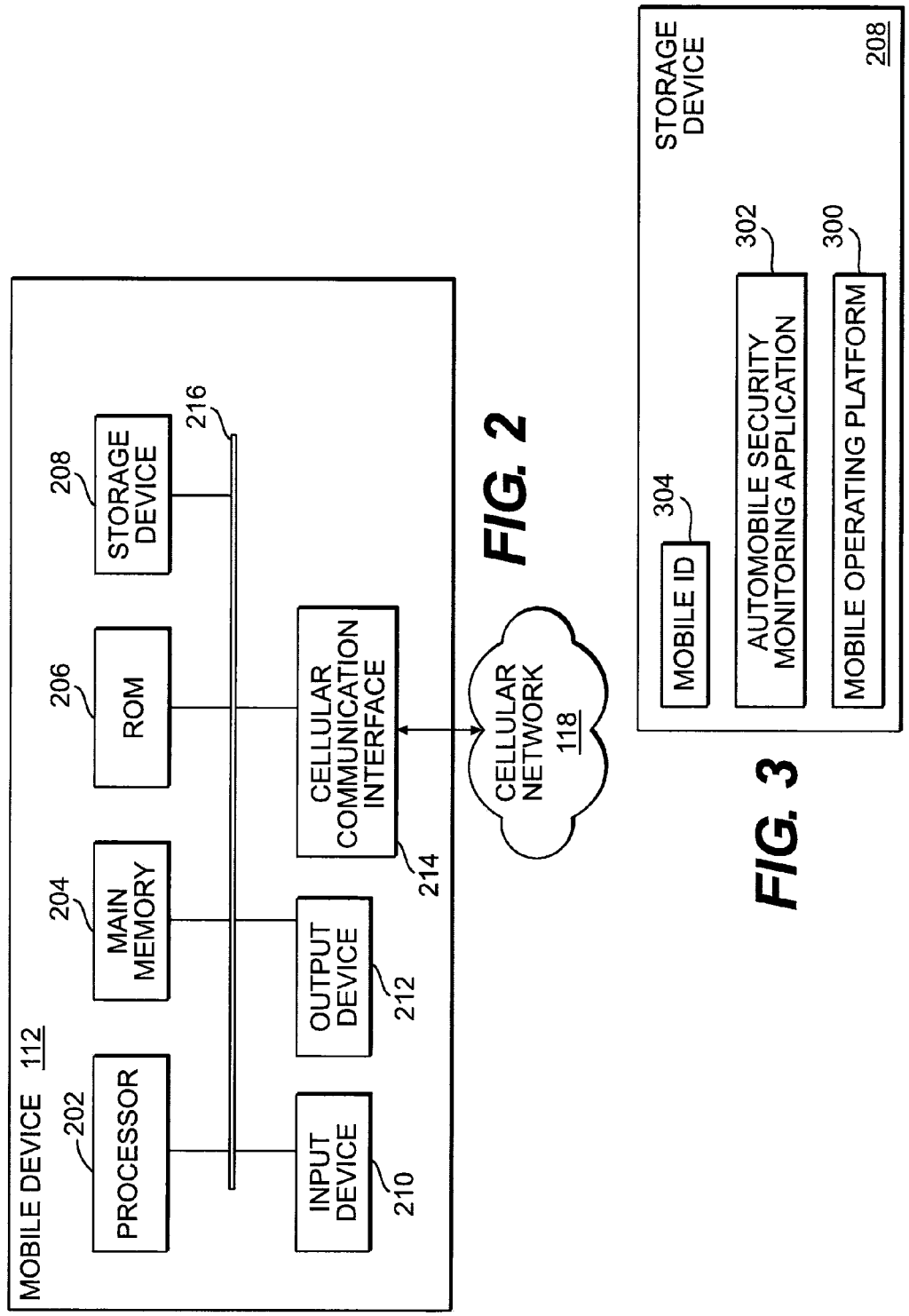

| 502 | 504 | 506 | 508 | 510 | 512 | 514 |
|---|---|---|---|---|---|---|
| | | AUTOMOBILE SECURITY THREAT LOG 500 | | | | |
| THREAT ID | THREAT LOCATION | THREAT TYPE | THREAT DURATION | THREAT TIME | SECURITY CAMERA 1 VIDEO | SECURITY CAMERA 2 VIDEO |
| — | — | — | — | — | — | — |
| — | — | — | — | — | — | — |
| — | — | — | — | — | — | — |

*FIG. 5*

METHODS AND SYSTEMS FOR AUTOMOBILE SECURITY MONITORING

BACKGROUND INFORMATION

Automobile alarms discourage theft by activating a siren, activating the horn, or by flashing the lights when conditions for triggering an alarm are met. For example, an automobile alarm may monitor the doors, trunk, hatch, and/or ignition for unauthorized entry, and trigger the alarm when unauthorized entry is detected. Some automobile alarm systems also trigger an alarm in response to detecting a shock to the automobile resulting from an external force.

Automobile security monitoring systems, such as LoJack® provide a radio transceiver in a hidden location on the automobile. The radio transceiver emits a radio signal. In the event that the automobile is stolen, law enforcement can decode the signal and determine the location of the stolen automobile.

Although these automobile alarms and security systems are useful, they are limited in terms of their functionality. This disclosure is directed to overcoming one or more problems in the art.

BRIEF DESCRIPTION OF THE DRAWINGS

FIG. 1 illustrates an exemplary automobile security monitoring system, consistent with the disclosed embodiments;

FIG. 2 illustrates an exemplary mobile device associated with the automobile security monitoring system, consistent with the disclosed embodiments;

FIG. 3 illustrates an exemplary a storage device of the mobile device, consistent with the disclosed embodiments;

FIG. 5 illustrates an exemplary automobile security threat log;

DETAILED DESCRIPTION

Figure 4:
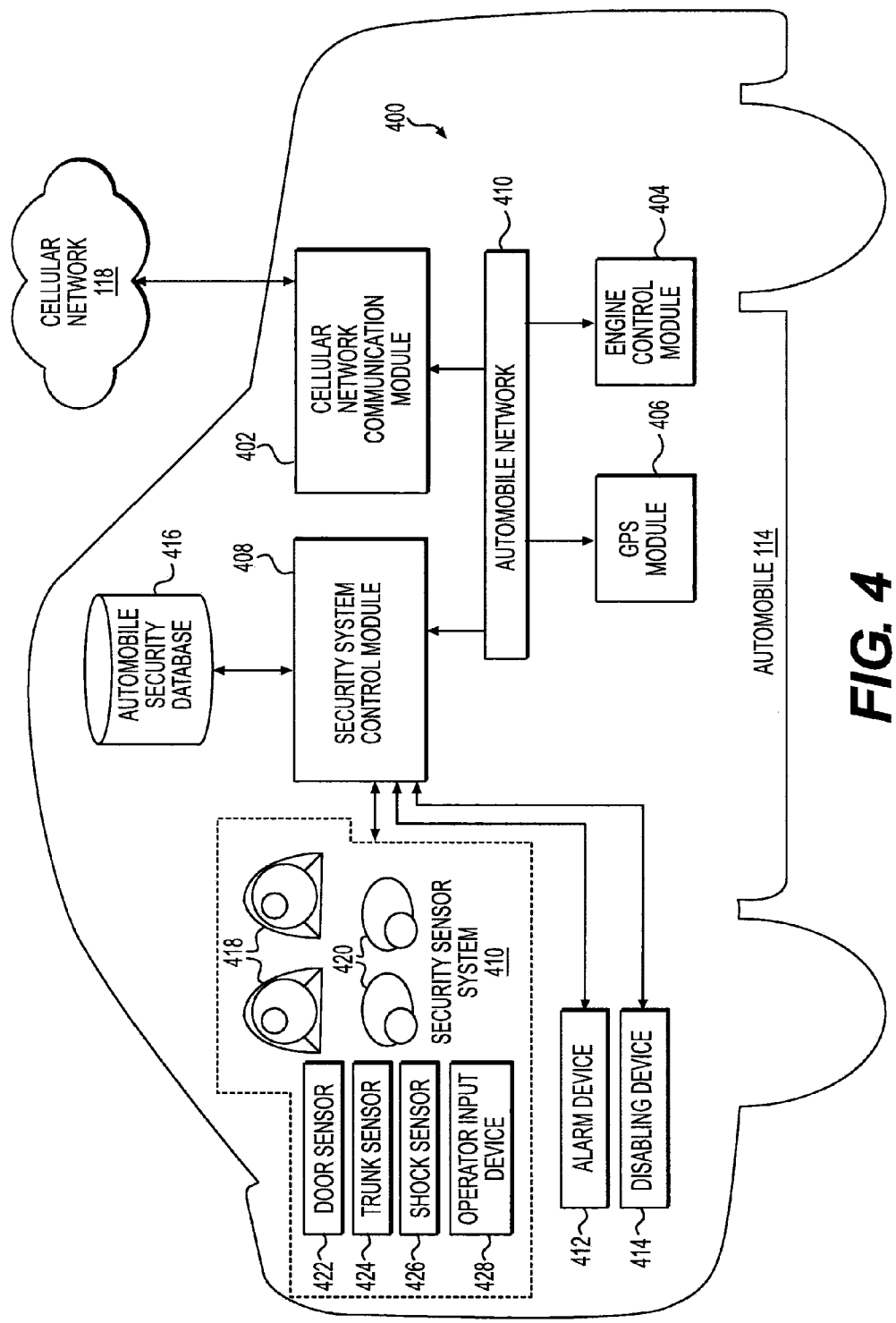
FIG. 4 illustrates an exemplary automobile configured for use in the automobile security monitoring system, consistent with the disclosed embodiments.

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments do not represent all implementations consistent with the disclosure. Instead, they are merely examples of systems and methods consistent with aspects related to the disclosure as recited in the appended claims.

As used herein, automobile owner or operator means any person or other entity having a property interest, ownership interest, usage interest, possessory interest, custodial interest, or other interest in an automobile. The two terms are used interchangeably, and are merely intended to refer to any person or entity that may have a sufficient interest in the automobile to benefit from the disclosed automobile security monitoring system.

One aspect of the disclosure relates to a method for monitoring the security of a plurality of automobiles. The method may include monitoring, over a network, the security of the plurality of automobiles, receiving, from one of the plurality of automobiles over the network, a message indicating a potential security threat to the automobile, and sending, over the network to a terminal device associated with an owner of the automobile, an alert indicating the potential security threat to the automobile. The method may further include receiving, over the network from the terminal device and responsive to the alert, a request of the owner to stream video from a security camera onboard the automobile, issuing, to the automobile over the network and based on the request, a command to the automobile to stream video from the security camera onboard the automobile, and receiving, from the automobile over the network, video from the security camera onboard the automobile. Finally, the method may include streaming received video over the network to the terminal device.

Another aspect of the disclosure relates to another automobile security monitoring method. The method may include connecting the automobile to a mobile communication network, monitoring signals from an automobile security sensor system onboard the automobile, and detecting, based on the signals, a potential security threat to the automobile. The method may further include sending, to a server over the mobile communication network, a message indicating the detected potential security threat to the automobile, and receiving, from the server over the mobile communication network, a command from an owner of the automobile to stream video from a security camera onboard the automobile. Finally, the method may include streaming received video from the security camera over the mobile network to the server.

Another aspect of the disclosure relates to yet another method for monitoring the security of an automobile using a mobile device. The method may include connecting the mobile device to a mobile network, receiving, from a server over the mobile network, an alert message indicating a potential security threat to the automobile, and launching an automobile security monitoring application on the mobile device, the automobile security monitoring application including a first user interface (UI) element for requesting the server to issue a command to stream video from a security camera onboard the automobile over a network. The method may further include receiving a selection of the first UI element of the automobile security monitoring application. In response to the selection of the first UI element, a request is sent to the server to issue a command to the automobile to stream video from the security camera onboard the automobile over a network. The method may further include receiving, over the mobile network from the server, a video stream of the security camera onboard the automobile, and displaying the received video stream on a display device associated with the mobile device.

Another aspect of the disclosure relates to an automobile security monitoring system. The system may include a communication module configured to connect the automobile to a server over a mobile communication network, an automobile security sensor system including at least one sensor and at least one security camera onboard the automobile, and a security control module. The security control module may monitor signals from the at least one sensor, may detect, based on the signals, a potential security threat to the automobile, and may send, to the server over the mobile communication network, a message indicating the detected potential security threat to the automobile. The security control module may further receive, from the server over the mobile communication network, and responsive to the message, a command to stream video of the security camera over the mobile network and, in response to the command, may stream video of the security camera over the mobile network via the communication module.

Another aspect relates to another method for monitoring the security of a plurality of automobiles. The method may include monitoring, over a network, the security of the plurality of automobiles, receiving, from one of the plurality of automobiles over the network, a message indicating a potential security threat to the automobile. The method may also include sending, over the network to a terminal device associated with an owner of the automobile, an alert indicating the potential security threat to the automobile, responsive to the potential security threat, receiving video data from a security camera onboard the automobile, and streaming the received video data to the terminal device over the network.

FIG. 1 illustrates an exemplary automobile security monitoring system 100 configured to provide the disclosed automobile security monitoring service. System 100 may be associated with an Internet service provider, a wireless service provider, a telecommunications service provider, a content service provider, or another entity that provides the disclosed automobile security monitoring service. In other embodiments, system 100 may be associated with an automobile company, a government law enforcement agency, a private security firm, or other entity that provides the disclosed automobile security monitoring service.

In general, system 100 may provide an automobile security monitoring service to one or more owners of one or more automobiles. In one embodiment, the owner or operator must have an account with system 100 to take advantage of the disclosed automobile security monitoring service. In other arrangements, for example, the disclosed automobile security service may be included as a feature of a particular automobile model, such as an upgraded security package.

In one embodiment, system 100 may alert an owner or operator of an automobile when the automobile is subject to a potential security threat. For example, the automobile may be equipped with a security system. When the security system detects a security threat to the automobile, such as physical contact to the body of the automobile or a door being opened without the key or remote, system 100 may send an e-mail, a text message, or other type of alert to the operator's mobile device (e.g., smartphone) over a network.

Moreover, system 100 may allow the operator to remotely monitor the security threat. For example, the automobile security system may include one or more security cameras mounted on or in the automobile. Using an application installed on the operator's mobile device, or using a web application at a remote terminal, the operator may instruct system 100 to stream video of the security threat collected by the onboard cameras, over the network, to the mobile device or to the remote terminal. In addition, the application may allow the operator to pan, tilt, zoom, or otherwise control the onboard cameras, over the network, to obtain a better view of the security threat. In some embodiments, the application may also allow the operator to stream video of the security threat from a nearby public camera, if available. For example, the operator may switch to a public camera to determine whether someone is attempting to break into the automobile.

System 100 also has functions allowing the operator to thwart the security threat. For example, the operator may decide that the security threat is legitimate based on the streaming video or on other information. In response, using the application, the operator may disable one or more systems of the automobile over the network. For example, the operator may shut down and/or lock the automobile engine off. The operator may also remotely activate the alarm system. In addition, the operator may use the application to submit a security threat report to local law enforcement. These and other functions of system 100 will be discussed in greater detail below.

As shown in FIG. 1, system 100 may include a mobile system 102, an automobile security service system 104, a local system 106, and a law enforcement system 108 in communication over the Internet 110. In one embodiment, mobile system 102 may include one or more mobile devices 112, one or more automobiles 114, and one or more public security cameras 116 configured to communicate on a cellular network 118. Mobile system 102 may also include a cellular network gateway 120 configured to facilitate communications between cellular network 116 and the Internet 110.

Mobile device 112 may be any type of mobile device configured to communicate over cellular network 118. For example, mobile device 112 may be a smartphone, a cell phone, a personal digital assistant (PDA), or other type of mobile device equipped to communicate voice and/or data over cellular network 118. FIG. 2 illustrates an exemplary mobile device 112, consistent with the disclosed embodiments. As shown in FIG. 2, mobile device 112 may include, for example, a processor 202, a main memory 204, a read-only memory (ROM) 206, a storage device 208, an input device 210, an output device 212, and a cellular network communication interface 214 interconnected via a communications bus 216.

Processor 202 may include any general-purpose or specially-constructed computer microprocessor configured to execute computer program instructions stored in main memory 204. Main memory 204 may include, for example, a random access memory (RAM) or other type of dynamic or volatile storage device. Main memory 204 may store information and instructions loaded from ROM 206 for execution by processor 202.

ROM 206 may be any static or nonvolatile memory storage device configured to store computer program instructions for loading into main memory 204 and execution by processor 202. For example, ROM 206 may be a programmable read-only memory (PROM), such as an erasable programmable read-only memory (EPROM), an electronically erasable programmable read-only memory (EEPROM), a one-time programmable read-only memory (OTP), a field-programmable read-only memory (FPROM), or a flash memory device.

Storage device 208 may include any type of mass data storage device. For example, storage device 208 may include a magnetic data storage device, such as a hard drive. Alternatively or additionally, storage device 208 may include a solid-state drive (SSD). It is to be appreciated, however, that storage device 208 may embody any type of mass data storage device known in the art.

FIG. 3 shows an exemplary representation of information stored in storage device 208. As shown, storage device 208 may contain a mobile operating platform 300, an automobile security monitoring application 302, and/or a mobile ID 304. Mobile operating platform 300 may be any type of operating environment for a mobile computing device within which one or more mobile applications can execute. For example, mobile operating platform 300 may be the Nokia Symbian® operating environment, the Apple IOS® operating environment, the RIM Blackberry® operating environment, the Google Android® operating environment, the Windows Mobile® operating environment, or another graphical operating environment configured to execute on a mobile computing device.

Automobile security monitoring application 302 may be an application configured to execute on mobile operating platform 300 to perform functions of the disclosed automobile security monitoring service. In one embodiment, mobile device 112 may download application 302 from automobile security service system 104. For example, an owner or operator of automobile 114 may register for the disclosed automobile security monitoring service with automobile security service system 104 and create an account for one or more mobile devices 112, automobile operators, and/or automobiles 114. After registering, application 302 may be downloaded to mobile device 112.

Mobile ID 304 may include any form of identification associated with mobile device 112. For example, mobile ID 304 may include a serial number, a network ID, a network address on cellular network 118, an identification of an owner or account holder of mobile device 112, or any other information used to identify mobile device 112.

Returning to FIG. 2, input device 210 may include one or more mechanisms that permit a user to input information or commands to mobile device 112. For example, input device 210 may include a keyboard, a touch screen, a touch pad, a mouse, a pen, a voice recognition device, a biometric data recognition device, a still camera, a video camera, an accelerometer, a microphone, or any other type of device for enabling user input to a computing device.

Output device 212 may include one or more mechanisms that output information to the user of mobile device 112. For example, output device 212 may include a display device, a speaker, a vibrating device, a lighting device or lamp, or any other type of device for providing output to a user of a computing device.

Cellular communication interface 214 may include any device or system enabling mobile device 112 to communicate over cellular network 118. For example, cellular communication interface 214 may include a radio antenna and/or transceiver for communicating voice and/or data over a $2^{nd}$ Generation (2G) cellular communication network, a $3^{rd}$ Generation (3G) cellular communication network, a $3^{rd}$ Generation Long Term Evolution (LTE) network, a $4^{th}$ Generation (4G) cellular communication network, a Global System for Mobile Communications (GSM) network, or any other type of mobile communication network 118 known in the art. In general, mobile device 112 may communicate with automobile security service system 104 over cellular network 118 using cellular communication interface 214, in connection with the disclosed automobile security monitoring service.

FIG. 4 illustrates an exemplary representation of an onboard automobile system 400, consistent with the disclosed embodiments. As shown, in one embodiment, system 400 may include a cellular network communication module 402, an engine system control module 404, a global positioning system (GPS) module 406, and a security system control module 416 interconnected by an automobile network 410. Automobile network 410 may be, for example, a controller area network (CAN) bus, an Ethernet network, or any other type of onboard automobile communication network known in the art.

In one embodiment, modules 402-408 may include one or more computers onboard automobile 114 configured to perform or control various automotive functions. For example, modules 402-408 may include electronic control units (ECU), such as application-specific integrated circuits (ASIC), field-programmable gate arrays (FPGA), or other types of computer processing devices known in the art. In other embodiments, however, modules 402-408 may be software modules of a computer program executing on an automobile computer.

Cellular network communication module 402 may be configured to control one or more communication devices of automobile 114 to communicate over cellular network 118, in connection with the disclosed automobile security monitoring service. For example, cellular network communication module 404 may include a radio antenna and/or transceiver for communicating data over a $2^{nd}$ Generation (2G) cellular communication network, a $3^{rd}$ Generation (3G) cellular communication network, a $3^{rd}$ Generation Long Term Evolution (LTE) network, a $4^{th}$ Generation (4G) cellular communication network, a Global System for Mobile Communications (GSM) network, or any other type of mobile communication network 118 known in the art. Cellular network communication module 402 may also be configured to establish a connection or communications session (e.g., an IP communications session) with mobile devices 112, with automobile security service system 104, with terminal devices associated with local system 106, and/or with a law enforcement system 108 over cellular network 118.

Cellular network communication module 402 may be configured to receive automobile security commands from automobile security service system 104. For example, in response to operator input to mobile device 112 and/or to a terminal device associated with local system 106, cellular network communication module 402 may receive an engine lock off command from automobile service system 104 over cellular network 118. Cellular network communication module 404 may then send the engine lock off command to engine system control module 404 or to security system control module 408 over automobile network 410.

Cellular network communication module 402 may also be configured to receive a command to trigger an alarm state of a security system of automobile 114. For example, in response to operator input to mobile device 112 and/or to a terminal device associated with local system 106, cellular network communication module 402 may receive an alarm trigger command from automobile service system 104 over cellular network 118. Cellular network communication module 402 may then send the alarm trigger command to security system control module 408 over automobile network 410.

Cellular network communication module 402 may also be configured to receive a command to stream video from security cameras onboard automobile 114 over cellular network 118. For example, the operator at mobile device 112 or at a terminal device associated with local system 106 may input a request to stream video from a selected security camera onboard automobile 114. In response, cellular network communication module 402 may receive a stream video command from automobile security service system 104 over cellular network 118. Cellular network communication module 402 may establish a communication session, such as an IP communications session, with automobile security service system 104, with the mobile device 112, and/or with the terminal device of local system 106. In addition, cellular network communication module 402 may send a streaming video command over automobile network 410 to security system control module 408. Cellular network communication module 402 may then receive the video of the selected security camera from security system control module 408 over automobile network 410. Cellular network communication module 402, in turn, may stream the received audio and/or video over cellular network 118 to automobile security service system 104, to the mobile device 112, and/or to the terminal device of local system 106.

Cellular network communication module 402 may also be configured to receive a security camera control command over cellular network 118. For example, the operator at mobile device 112 or at a terminal device associated with local system 106 may input a request to pan, tilt, or zoom a selected security camera onboard automobile 114. In response, cellular network communication module 402 may receive a command to pan, tilt, or zoom the selected security camera from automobile security service system 104 over cellular network 118. Cellular network communication module 402 may then send the security camera control command to security system control module 408 over automobile network 410.

Cellular network communication module 402 may be further configured to receive a request for an automobile security threat report over cellular network 118. For example, the operator at mobile device 112 or at a terminal device associated with local system 106 may input a request to transmit an automobile security threat report to law enforcement system 108. In response, cellular network communications module 402 may receive the command from automobile security service system 104 over cellular network 118. Cellular network communication module 402 may then send a security report request to security system control module 408 over automobile network 410. Upon receiving security threat log data (e.g., including the location of the automobile 114, among other information) from security system control module 408, cellular network communication module 402 may send the security threat log data to the law enforcement system 108 over cellular network 118. Law enforcement may use the security report to investigate the security threat, to track automobile 114 (if stolen), to contact the automobile owner, to prepare a formal police report, or to otherwise process the security threat.

Cellular network communication module 402 may also be configured to provide an alert to automobile security service system 104 over cellular network 108 when a potential threat to the security of automobile is detected. For example, cellular network communication module 402 may receive from security system control module 408 over automobile network 410 a message indicating that security system control module 408 has detected a potential security threat to automobile 114. In response, cellular network communication module 402 may transmit a security threat alert message to automobile security service system 104 over cellular network 118. Upon receiving the security threat alert message, automobile security service system 104 may notify the owner or operator of the automobile 114 via e-mail, text message, telephone call, voice message, or other appropriate means.

Engine system control module 404 may be configured to power off and/or lock off the engine or other power source of automobile 114 to thwart a security threat. As discussed above, in response to receiving a command over cellular network 118, cellular network communication module 402 may send an engine lock off command to engine system control module 404 over automobile network 410. Upon receiving the engine lock off command, engine system control module 404 may power off and/or lock off the engine or other power source of automobile 114. In one embodiment, engine system control module 404 may lock off the engine or other power source until the owner of automobile 114 releases the lock state with the original mechanical or electronic key of the automobile 114, by inputting an appropriate password, or by other means.

GPS module 406 may be configured to determine the geographical location (e.g., latitude and longitude) of automobile 114 based on signals received from one or more satellites. GPS module 406 may also continuously, periodically, or responsively transmit information regarding the determined geographical location of automobile 114 on automobile network 410.

Security system control module 408 may be configured to perform functions in connection with the disclosed automobile security monitoring service. In one embodiment, security system control module 408 may be configured to communicate with an automobile security sensor system 410, with an alarm device 412, with an automobile disabling device 414, and/or with an automobile security database 416.

As shown in FIG. 4, in one embodiment, automobile security sensor system 410 may include one or more security cameras 418, one or more motion detectors 420, one or more door sensors 422, a trunk sensor 424, a shock sensor 426, and an operator input device 428. But it is contemplated that automobile security sensor system 410 may include additional, fewer, and/or other types of sensors, if desired.

Security camera 418 may include any camera device positioned to view a security threat to automobile 114, such as a thief. For example, one or more security cameras 418 may be mounted inside automobile 114 to view a security threat in the cabin of automobile 114. Alternatively or additionally, one or more security cameras 418 may be mounted to view a potential security threat outside, but in the vicinity of, automobile 114.

In one embodiment, security camera 418 may be a video camera device. For example, security camera 418 may be a webcam device configured to collect video data within its field of view and stream the video data to security system control module 408 over a link. In addition, security camera 418 may have the capability to pan, tilt, and/or zoom, in response to commands, to obtain a better view of a potential security threat. It is also contemplated that security camera 418 may be a still image camera device configured to capture still images and transmit the still images to security system control module 408.

Security system control module 408 may be configured to control a selected security camera 418 to stream video over cellular network 118. For example, in response to receiving a command from cellular network communication module 402 over automobile network 410 to begin streaming video, security system control module 408 may power on security camera 418. Security camera 418 may then begin collecting video of a potential security threat within its field of view. Security system control module 408, upon receiving the video data from security camera 418, may transmit the received video data on automobile network 410 to cellular network communication module 402 for streaming over cellular network 418. In some embodiments, security system control module 408 may also store the received video in automobile security database 416.

Security system control module 408 may also be configured to control a selected security camera 418 to obtain a better view of a potential security threat to automobile 114.

For example, the automobile operator, using mobile device 112 or a terminal device of local system 106, may input a selection of a desired security camera 418 as well as a command to pan, tilt, or zoom the selected security camera 418. In response, security system control module 408 may receive a command to pan, tilt, or zoom the selected security camera 418 over automobile network 410 from cellular network communication module 402. Security system control module 408 may then control the selected security camera 418 to pan, tilt, and/or zoom as commanded by the operator.

Motion detector 420 may include any device or sensor positioned to detect the motion of a potential security threat to automobile 114, such as a thief. For example, one or more motion detectors 420 may be mounted inside automobile 114 to detect the motion of a potential security threat within the cabin of automobile 114. Alternatively or additionally, one or more motion detectors 420 may be mounted on the exterior of automobile 114, or inside automobile 114 but facing outward, to detect the motion of a potential security threat outside, but in the vicinity of, automobile 114. Motion detector 420 may generate a signal indicative of any detected motion, and may provide the signal to security system control module 408 over a link.

Security system control module 408 may be configured to detect a potential security threat to automobile 114 based on the signal from motion detector 420. For example, security system control module 408 may identify a potential security threat when the signal indicates motion inside the cabin of automobile 114 or in the vicinity of automobile 114 for a period of time, such as a few minutes. In response to identifying a potential security threat based on motion detector 420, security system control module 408 may send a security alert message to cellular network communication module 402 over automobile network 410. The security alert message may contain information about the identified potential security threat. For example, the alert message may describe a type of the potential threat (e.g., motion inside or outside of automobile 114), a duration of the potential threat (e.g., two minutes), and/or a time associated with the potential threat (e.g., 2:15 AM). Cellular network communication module 402, in turn, may communicate the alert message over cellular network 118.

Door sensor 422 may include any switch, detector, or other device configured to detect when an associated door of automobile 114 is opened or attempted to be opened. For example, automobile security sensor system 410 may include a door sensor 422 for each door of automobile 114. And door sensor 422 may generate a signal indicating whether the associated door is opened or attempted to be opened.

Security system control module 408 may be configured to detect a potential security threat to automobile 114 based on the signal from door sensor 422. For example, security system control module 408 may identify a potential security threat when the signal indicates that a door has been opened without the mechanical or electrical key associated with the automobile 114. In another embodiment, security system control module 408 may identify a potential security threat when the signal indicates one or more unsuccessful attempts to open a door of automobile 114, such as when the handle of a locked door is pulled a threshold number of times, or when the handles of different locked doors are pulled within a short period of time. In response to identifying a potential security threat based on door sensor 422, security system control module 408 may send a security alert message containing information about the threat to cellular network communication module 402 over automobile network 410. Cellular network communication module 402, in turn, may communicate the alert message over cellular network 118. Trunk sensor 424 may operate in a similar fashion with respect to a trunk or hatch of automobile 114.

Shock sensor 426 may include a pressure sensor, a switch, an accelerometer, or any other device configured to determine an intensity and/or duration of an external force applied to automobile 114, for example, due to a security threat. Shock sensor 426 may generate a signal indicative of the intensity and/or duration of the applied external force, which may be communicated to security system control module 408.

Security system control module 408 may identify a potential security threat to automobile 114 based on the signal from shock sensor 426. For example, security system control module 408 may identify a security threat when the signal indicates that an external force of at least a certain intensity and/or duration is applied to automobile 144, such as when a window is broken or when the automobile is struck by an object. In response to detecting a security threat based on shock sensor 426, security system control module 408 may communicate an alert message containing information about the potential threat to cellular network communication module 402 over automobile network 410. Cellular network communication module 402, in turn, may communicate the alert message over cellular network 118.

Operator input device 428 may include any device by which an owner or operator of automobile 114 is verified by or authenticated to automobile 114. For example, operator input device 428 may include a keypad by which the operator enters a password to unlock the door or start the engine. Alternatively, input device 428 may include a radio frequency ID (RFID) sensor configured to verify an RFID chip in the operator's automobile key. Operator input device 428 may generate a signal indicative of any received input, which may be communicated to security system control module 408.

Security system control module 408 may be configured to identify a potential security threat to automobile 114 based on the signal from operator input device 428. For example, security system control module 408 may identify a potential security threat when someone unsuccessfully inputs a password a certain number of times within a certain time period. As another example, security system control module 408 may identify a potential security threat when someone attempts to start automobile 114 but operator input device 428 detects an incorrect RFID. In response to detecting a potential security threat based on the signal from operator input device 428, security system control module 408 may communicate an alert message containing information about the potential threat to cellular network communication module 402 over automobile network 410. Cellular network communication module 402, in turn, may communicate the alert message over cellular network 118.

Alarm device 412 may include any device operable to deter a security threat to automobile 114, such as a thief. For example, alarm device 412 may include a siren, a device configured to activate the horn of automobile 114, a device configured to flash the lights of automobile 114, or any other such device.

Security system control module 408 may be configured to activate alarm device 412 in certain situations. In one embodiment, security system control module 408 may activate alarm device 412 in response to detecting a potential security threat to automobile 114, as described above. In other embodiments, security system control module may activate alarm device 412 in response to receiving an alarm activation command from cellular network communication module 402 over automobile network 410, such as when the owner or operator sends an alarm activation request from mobile device 112 or from a terminal device associated with local system 106.

Disabling device 414 may include any device operable to disable one or more systems of automobile 114 to deter theft. For example, disabling device 414 may include a wheel locking device, a transmission system locking device, a steering system locking device, an engine shutdown device, or any other such device known in the art.

Security system control module 408 may be configured to activate disabling device 414 in certain situations. For example, security system control module 408 may activate disabling device 414 in response to detecting a potential security threat to automobile 114, as described above. Alternatively or additionally, security system control module may activate disabling device 414 in response to receiving an automobile disable command from cellular network communication module 402 over automobile network 410, such as when the owner or operator sends an appropriate request from mobile device 112 or from a terminal device associated with local system 106.

Automobile security database 416 may contain information relating to detected potential security threats to automobile 114. FIG. 5 shows an exemplary automobile security threat log 500 stored in automobile security database 416. In one embodiment, security system module 408 may use automobile security threat log 500 in connection with sending an automobile security threat report to automobile security service system 104. As shown in FIG. 5, automobile security log 500 may include, for example, a threat ID 502, a threat location 504, a threat type 506, a threat duration 508, a threat time 510, and/or security camera video 512, 514.

Threat ID 502 may include any information used to identify an instance of a detected potential threat to the security of automobile 114. Threat ID 502 may be a reference number, a code, or any other piece of information assigned to a detected potential security threat to automobile 114. In one embodiment, security system control module 408 may assign a unique threat ID 502 to each instance of a detected potential security threat. For example, security system control module 408 may generate a new threat ID 502 and add the new threat ID 502 to a new entry in automobile security threat log 500 each time security system control module 408 identifies a potential security threat based on the signals received from motion detectors 420, from door sensors 422, from trunk sensor 424, from shock sensor 426, and/or from operator input device 428.

Threat location 504 may include the geographic location (e.g., latitude and longitude) of automobile 114 at the time of the detected potential security threat corresponding to the threat ID 502. For example, security system control module 408 may receive the automobile location from GPS module 406 over automobile network 410, and may store the received automobile location as the threat location 502.

Threat type 506 may include information describing the nature of the detected potential security threat corresponding to the threat ID 502. In one embodiment, threat type 506 may include information identifying the particular sensor(s) 420-428 that sensed the potential security threat. For example, if security system control module 408 identifies the potential security threat based on the signal from an interior motion detector 418, security system control module 408 may store information identifying the interior motion detector 418 as the threat type 506 corresponding to the threat ID 502. As another example, if security system control module 408 identifies the potential security threat based on the signal from a door sensor 422, security system control module 408 may store information identifying the door associated with the door sensor 404 (e.g., front passenger side door) as the threat type 506 corresponding to the threat ID 502.

Threat duration 508 may include information regarding the duration of the detected potential security threat corresponding to the threat ID 502. For example, threat duration 508 may indicate the length of the detected potential security threat in minutes. In one embodiment, security system control module 408 may calculate the threat duration 508 based on the signals received from sensors 420-428. For example, security system control module 408 may determine the threat duration 508 based on a period of time during which motion detectors 420 detect motion within the cabin of automobile 114 and/or in the vicinity of automobile 114.

Threat time 510 may indicate the time of the detected potential security threat corresponding to the threat ID 502. For example, upon identifying a potential security threat to automobile 114, security system control module 408 may determine the time of day based on an onboard clock or on the signal from GPS module 406, and may store the determined time of day as the threat time 510 for the identified potential security threat.

Security camera video 512, 514 may contain video data collected by a security camera 418 onboard automobile 114 during the detected potential security threat corresponding to the threat ID 502. For example, video 512 may contain the video associated with a first security camera 418 on automobile 114, and video 514 may contain video associated with a second security camera 418 on automobile 114. It is contemplated that automobile security threat log 500 may be extended to include video data associated with additional security cameras 418 on automobile 114, if any.

As discussed above, the owner or operator of automobile 114 may, from mobile device 112 or from a terminal device associated with local system 106, remotely command security system control module 408 to cause a selected security camera 418 to collect video data associated with the detected potential security threat. As or after security system control module 408 receives the video data from the security camera 418, security system control module 408 may store the received video data in automobile security threat log 500 (as video 512, 514, etc.). Security system control module 408 may store the video data 512, 514, as a Windows Media® file, Real Player Media® file, a Quicktime® file, a MPEG-4® file, Flash® file, or any other type of media format file known in the art.

Returning to FIG. 1, security cameras 116 may include any surveillance cameras positioned external to automobiles 114 to surveil certain areas. For example, security cameras 116 may be mounted to buildings, street lights, traffic lights, utility poles, or other public infrastructure to collect video of the surrounding environment. As used herein, the term public security camera means any camera located external to automobile 114, such as in a public area. The term is not intended to limit security cameras 116 to cameras being owned by the public. While in one embodiment pubic security cameras 116 may be owned and operated by local law enforcement, public works, city council, or another government body responsible for public safety, in other embodiments, security cameras 116 may be owned and operated by a private entity, such as an Internet service provider, a wireless service provider, a telecommunications service provider, a content service provider, or other entity that cooperates with the disclosed automobile security monitoring service.

In one embodiment, security cameras 116 may be Internet Protocol (IP) surveillance cameras. For example, security cameras 116 may each have an IP address and may collect and stream video over the Internet 110. And a remote device, such as mobile device 112 or a terminal device associated with local system 106, may access and display the streaming video of security cameras 116 by connecting to the IP addresses associated with security cameras 116.

Alternatively or additionally, security cameras 116 may be configured to communicate on cellular network 118. For example, security cameras 116 may each have a network address on cellular network 118 and may collect and stream video over cellular network 118. And a remote device, such as mobile device 112 or a terminal device associated with local system 106, may access and display the streaming video of security cameras 116 by connecting to the cellular network addresses associated with security cameras 116.

Cellular network 118 may include any combination of components or systems for wirelessly communicating data to create a mobile network. For example, cellular network 118 may include one or more base station antennas, switches, routers, amplifiers, repeaters, subscriber nodes, and/or other network communication devices. In one embodiment, cellular network 118 may be a $4^{th}$ Generation cellular network. In other embodiments, cellular network 118 may be a $2^{nd}$ Generation (2G) cellular communication network, a $3^{rd}$ Generation (3G) cellular communication network, a $3^{rd}$ Generation Long Term Evolution (LTE) network, a Global System for Mobile Communications (GSM) network, or any other type of mobile communication network 118 known in the art. Cellular network 118 may also communicate voice or data using Internet Protocol (IP) or other packet-switched protocols.

Cellular network gateway 120 may include any device capable of acting as an interface between cellular network 118 and the Internet 110. Cellular network gateway 120 may convert messages having cellular network protocols into messages having IP-compatible protocols or other packet-switched protocols. Cellular network gateway 120 may further implement protocols such as session initiation protocol (SIP) when making data available to the Internet 110. In one embodiment, cellular network gateway 120 may receive automobile security commands from automobile security service 104 over the Internet 110; convert the commands for communication on cellular network 118; and transmit the converted automobile commands on cellular network 118. Similarly, cellular network gateway 120 may receive data transmitted on cellular network 118, such as streaming security video from automobiles 114, convert the data for communication on the Internet 110, and transmit the converted data on the Internet 110.

Automobile security service system 104 may represent computing infrastructure associated with an Internet service provider, a wireless service provider, a telecommunications service provider, a content service provider, or other entity that provides the disclosed automobile security monitoring service. In one embodiment, automobile security service system 104 may include an automobile security service server 122 and an automobile security service web server 124.

Server 122 may embody a server computer, a network of server computers (e.g., distributed grid computers), a mainframe computer, or any other computing system for storing data and responding to requests for stored data over a network. Generally, server 122 may maintain account information associated with customers of the disclosed automobile security monitoring service. In response to requests received from automobile operators at mobile devices 112 and/or at terminal devices associated with local system 106, server 122 may issue various automobile security commands to automobiles 114 over the Internet 110. Moreover, server 122 may provide additional automobile security-related functions and/or services, discussed below.

Figure 6:
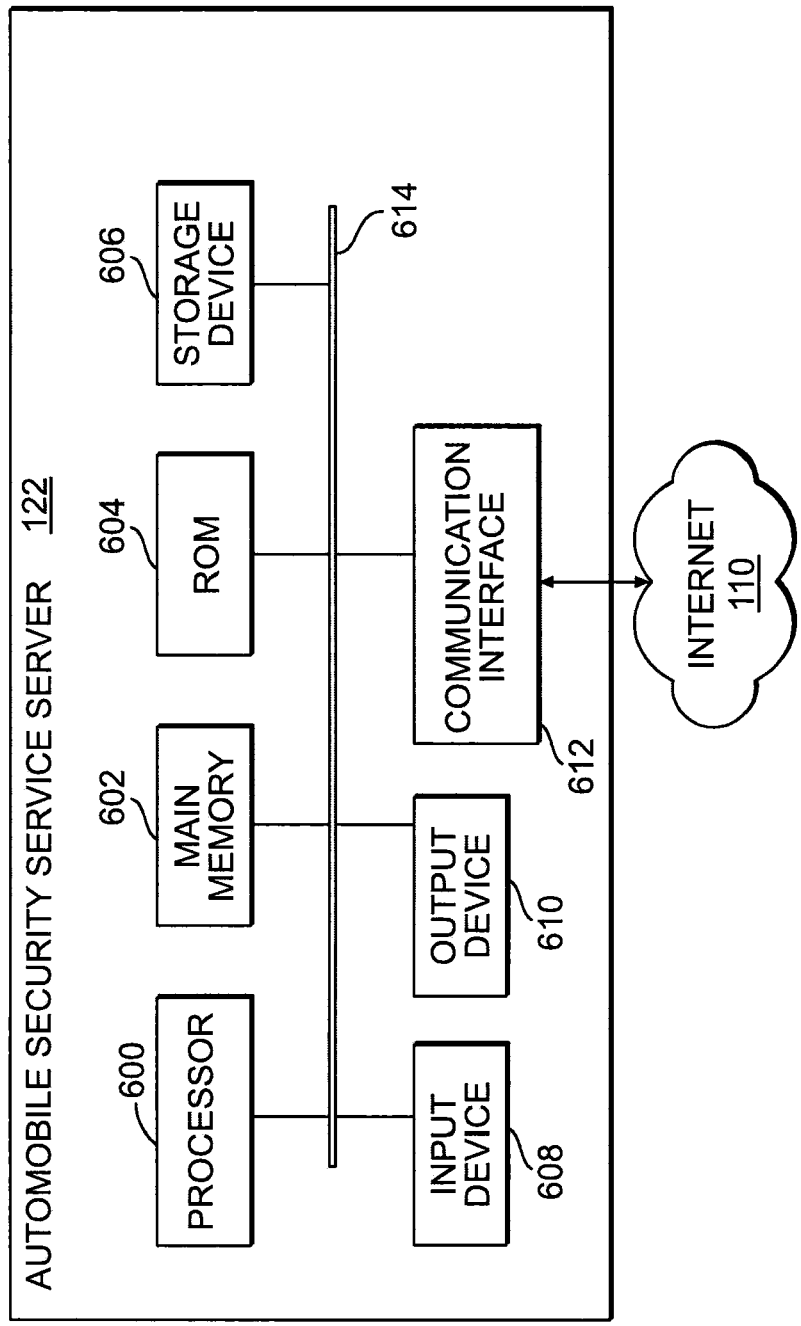
FIG. 6 illustrates an exemplary automobile security service server, consistent with the disclosed embodiments.

FIG. 6 illustrates an exemplary representation of automobile security service server 122. As shown, server 122 may include, for example, a processor 600, a main memory 602, a read-only memory (ROM) 604, a storage device 606, an input device 608, an output device 610, and a communication interface 612 interconnected via a communications bus 614.

Processor 600 may include any general-purpose or special-purpose computer microprocessor configured to execute computer program instructions stored in main memory 602. Main memory 602 may include, for example, a random access memory (RAM) or other type of dynamic or volatile memory storage device. Main memory 602 may store information and instructions loaded from ROM 602 for execution by processor 600 to perform the disclosed processes.

ROM 604 may be any static or nonvolatile memory storage device configured to store computer program instructions to be loaded into main memory 602 and executed by processor 600 to perform the disclosed processes. For example, ROM 604 may be a programmable read-only memory (PROM), such as an erasable programmable read-only memory (EPROM), an electronically erasable programmable read-only memory (EEPROM), a one-time programmable read-only memory (OTP), a field-programmable read-only memory (FPROM), or a flash memory device.

Storage device 606 may include any type of mass data storage device. For example, storage device 606 may include a magnetic data storage device, such as a hard drive. Alternatively or additionally, storage device 606 may include a solid-state drive (SSD). In other embodiments, storage device 606 may include a optical storage drive, such as a CD-ROM or DVD-ROM. It is to be appreciated, however, that storage device 606 may embody any type of mass data storage device known in the art.

Figure 7:
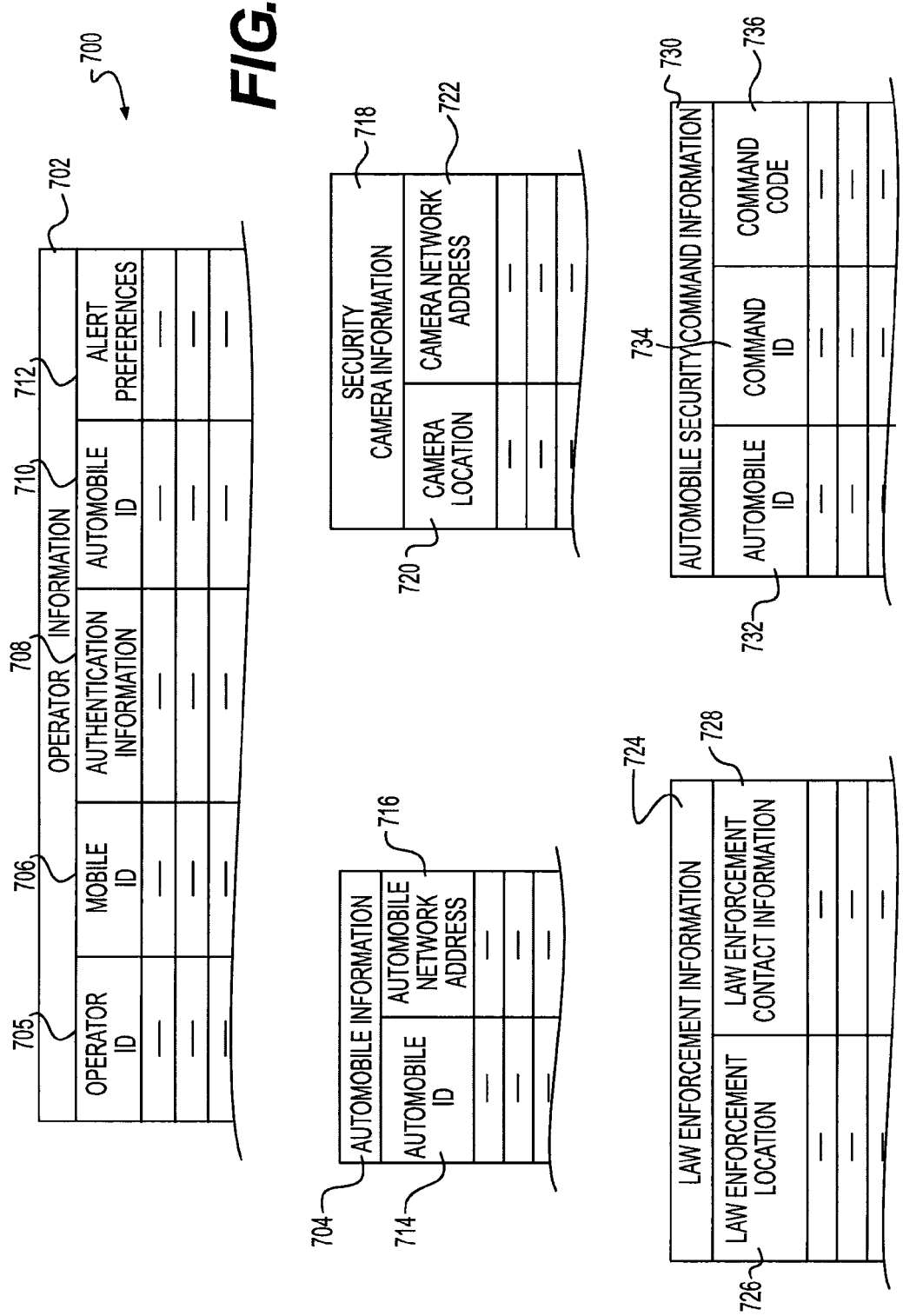
FIG. 7 illustrates exemplary information stored by the automobile security service server, consistent with the disclosed embodiments.

FIG. 7 shows an exemplary representation of automobile security monitoring information 700 stored in storage device 606. In one embodiment, automobile security monitoring information 700 may include account information, such as operator information 702 and automobile information 704. As discussed above, an owner or operator of automobile 104 may register for the disclosed automobile security monitoring service by creating an account with automobile security service system 104. Although FIG. 7 may show automobile security monitoring information 700 for one account, it is to be appreciated that storage device 606 may contain automobile security monitoring information 700 for a plurality accounts, each associated with one or more automobiles 114, one or more automobile operators, and/or one or more mobile devices 112.

Operator information 702 may contain information about each automobile owner or operator on the automobile security monitoring service account. For example, operator information 702 may contain an operator ID 705, a mobile ID 706, authentication information 708, an automobile ID 710, and alert preferences 712 associated with each owner or operator on the account. Operator ID 705 may include the name of the operator, the operator's username for the account (e.g., provided at registration), a social security number of the operator, or any other information identifying the operator.

Mobile ID 706 may include any information used to identify the particular mobile device 112 associated with each operator on the automobile security monitoring service account. For example, mobile ID 706 may be an address (e.g., IP address) on cellular network 118 of the mobile device 112, an address (e.g., IP address) on the Internet 110 of the mobile device 112, a network ID associated with the mobile device 112, or a serial number associated with the mobile device 112.

Authentication information 708 may include any information used to authenticate each owner or operator to automobile security monitoring service account. For example, authentication information 708 may include an account password, biometric data, or other information provided by the operator to verify the operator's identity for purposes of using the automobile security monitoring service.

Automobile ID 710 may include any information used to identify each automobile 114 associated with each owner or operator on the automobile security monitoring service account. In other words, automobile ID 710 may identify each automobile 114 assigned to the operator for purposes of providing the disclosed automobile security monitoring service. For example, automobile ID 710 may include a vehicle identification number (VIN) associated with the automobile 114; information regarding the manufacturer, the year of manufacture, and the model of the automobile 114; and/or any other information that may be used to identify the automobile 114 or automobiles 114 for which to provide the disclosed automobile security monitoring service.

Alert preferences 712 may include the preferences of each owner or operator on the account for receiving automobile security threat alerts. For example, alert preferences 714 may indicate whether the operator desires to receive an e-mail alert, a text message alert, a voice message alert, or a phone call alert, or other appropriate alert when system 100 detects a potential security threat to the operator's automobile 114 or automobiles 114. Alert preferences 714 may also include the operator's desired contact information for receiving alerts. For example, alert preferences 714 may indicate an e-mail address of the operator to which the e-mail alert is to be sent, a telephone number of the operator to which the phone call alert, voice message alert, or text message alert is to be sent, or other information for contacting the operator when a potential automobile security threat is detected.

In embodiment, automobile information 704 may include an automobile ID 714 and an automobile network address 716 for each automobile 114 associated with the automobile security monitoring service. Automobile ID 714 may include a vehicle identification number (VIN) associated with the automobile 114; information regarding the manufacturer, the year of manufacture, and the model of the automobile 114; and/or any other information that may be used to identify each automobile 114 associated with an automobile security monitoring service account. Further, automobile network address 716 may include a network address (e.g., IP address) of the automobile 114 on cellular network 118, a network address (e.g., IP address) of the automobile 114 on the Internet 110, a network ID associated with the automobile 114, or other information that can be used to connect to automobile 114 over cellular network 118 and/or over the Internet 110.

Continuing with FIG. 7, automobile security monitoring information 700 may further include security camera information 718. In one embodiment, security camera information 718 may include camera location information 720 and a camera network address 722 associated with each security camera 116 of system 100.

Camera location information 720 may include information regarding the geographical location of each security camera 116 of system 100. For example, camera location information 720 may include the latitude and longitude of the security camera 116, the street address of the security camera 116, the location of the security camera 116 in a coordinate frame associated with system 110, or other information specifying the geographical location of the security camera 116.

Camera network address 722 may include a corresponding network address of each security camera 116 of system 100. For example, camera network address 722 may include a network address (e.g., IP address) of the security camera 116 on cellular network 118, a network address (e.g., IP address) of the security camera 116 on the Internet 110, a network ID associated with the security camera 116, or other information that can be used to connect to the security camera 116 over cellular network 118 and/or over the Internet 110.

Automobile security monitoring information 700 may further include law enforcement information 724. In one embodiment, law enforcement information 724 may include law enforcement location information 726 and law enforcement contact information 728.

Law enforcement location information 726 may include information regarding the geographical location of law enforcement agencies associated with system 100. For example, law enforcement location information 726 may include the latitude and longitude, the street address, the location in a coordinate frame associated with system 110, or other information specifying the geographical location of different law enforcement agencies (e.g., local police departments) supporting the disclosed automobile security monitoring service.

Law enforcement contact information 728 may include corresponding contact information associated with each law enforcement agency associated with system 100. For example, contact information 728 may include an e-mail address, a telephone number, a network address (e.g., IP address) on the Internet 110, or other means by which automobile security service system 104 can send an automobile security alert to law enforcement system 108.

Automobile security monitoring information 700 may further include automobile security command information 730. In one embodiment, automobile security command information 730 may be a library of automobile security commands server 122 may issue over the Internet 110 to automobiles 114 associated with a security monitoring account. For example, automobile security command information 730 may include commands to stream video from the onboard security cameras 418; commands to pan, tilt, or zoom a selected onboard security camera 418; commands to activate the alarm device 412; commands to activate the automobile disabling device 414; commands to lock the engine or other power source off; and/or commands to issue an automobile security threat report to law enforcement system 108 for a plurality of types of automobiles 114 made by different manufactures.

In one embodiment, automobile security command information 730 may include automobile IDs 732, command IDs 734, and command codes 736 associated with automobiles 114 on a security monitoring account. Automobile IDs 732 may include vehicle identification numbers (VIN) associated with the automobiles 114; information regarding the manufacturer, the year of manufacture, and the model of the automobiles 114; and/or any other information that may be used to identify the automobiles 114.

Command IDs 734 may include information regarding the security commands (mentioned above) that may be issued automobiles 114 on the security monitoring account. For instance, command IDs 734 may include names of the security commands, reference numbers associated with the security commands, or other information that may be used to identify particular desired automobile security commands.

Command codes 736 may contain specific codes or instructions that may be issued to automobiles 114 on the security monitoring account to cause automobiles 114 to execute the security commands. In one embodiment, command codes 736 include codes or instructions that may be broadcast on automobile network 410 and executed by security system control module 408 to carry out the commands. For example, command codes 736 may be CAN bus codes or other codes provided by the manufacturers of automobile 114 and/or the manufacturers of the automobile systems.

Returning to FIG. 6, input device 608 may include one or more mechanisms that permit a user to input information or commands to server 122. For example, input device 608 may include a keyboard, a touch screen, a touch pad, a mouse, a pen, a voice recognition device, a biometric recognition device, a still camera, a video camera, an accelerometer, a microphone, or any other type of device for enabling user input to a computing device.

Output device 610 may include one or more mechanisms that output information to the user of server 122. For example, output device 610 may include a printer, a speaker, a display, or any other type of device for outputting data to a user of a computing device. Communication interface 612 may include any device or system enabling server 122 to communicate over the Internet 110.

Server 122 may be configured to perform various functions in connection with the disclosed automobile security monitoring service. Specifically, processor 600 may execute instructions stored in memory 602 to perform the disclosed functions.

For example, server 122 may be configured to authenticate an automobile operator to automobile security service system 104. For example, server 122 may receive a username, mobile ID, password, and/or biometric data over the Internet 110 from an automobile operator at a mobile device 112 or at a terminal device associated with local system 106. Server 122 may then find an operator ID 705 corresponding to the received username in operator information 702. If found, server 122 may compare the received mobile ID, password, and/or biometric data to the mobile ID 706 and/or to the authentication information 708 corresponding to the operator ID 705 to authenticate the automobile owner.

Moreover, server 122 may be configured to receive automobile security command requests (e.g., if the operator is properly authenticated). In one embodiment, server 112 may receive a security command request over the Internet 110 from the automobile operator at mobile device 112 or at a terminal device associated with local system 106. For example, server 112 may receive a request to stream video from a security camera 418 onboard an automobile 114; a request to pan, tilt, or zoom a selected security camera 418 onboard an automobile 114; a request to activate an alarm device 412 onboard the automobile 114; a request to activate the disabling device 414 of automobile 114; a request to lock off the engine or other power source of the automobile 114; a request to issue a security threat report to law enforcement system 108; or a request to stream video from a security camera 116 near the automobile 114. Automobile-related requests may contain, for example, an automobile ID and a command ID. In some embodiments, server 112 may compare the received automobile ID to the automobile ID 710 contained in operator information 700 to confirm that the operator has the authority to issue security commands to the automobile 114.

Server 122 may also be configured to issue a requested command to the automobile 114. For example, server 122 may look up the automobile ID and command ID contained in the request in automobile security command information 730 and retrieve a corresponding command code 736. Server 122 may also look up the received automobile ID in automobile information 704 to retrieve a corresponding automobile network address 716. Then server 122 may generate an appropriate command based on the retrieved code, and may transmit the code over the Internet 110 to the automobile 114 at the retrieved automobile network address 716.

Server 122 may also be configured to stream video data received from the automobile 114 to the operator at the mobile device 122 or at the terminal device associated with local system 106. For example, during a communications session with automobile 114, server 122 may receive streaming video collected by a security camera 418 onboard the automobile 114 over the Internet 110. Server 122 may then relay the received streaming video to the mobile device 112 over the Internet 110 during a communications session with the mobile device 112. Alternatively or additionally, server 112 may provide the streaming video to web server 124, which may relay the received streaming video to the terminal device of local system 106 via a web page of an automobile security monitoring service website.

Server 122 may also be configured to receive a command request to stream video from a security camera 116 in the vicinity of the automobile 114. In response to the request, server 122 may receive the location (e.g., GPS data) of the automobile 114 over the Internet 110. Server 122 may then search security camera information 718 to find a camera location 720 that corresponds to the received automobile location. For example, server 122 may identify the security camera 116 closest to the automobile 114, or may identify any security cameras 116 within a certain distance (e.g., 100 meters) of the automobile 114. Server 122 may then retrieve the camera network address 722 corresponding to the identified security camera 116. Server 122 may then connect to the retrieved camera network address 722 over the Internet 110 to receive streaming video from the identified security camera 116. Server 122 may then relay the received streaming video to the mobile device 112 over the Internet 110 during a communications session with the mobile device 112. Alternatively or additionally, server 112 may provide the streaming video to web server 124, which may relay the received streaming video to the terminal device of local system 106 via the automobile security monitoring service web page.

Server 122 may also be configured to send an alert to the automobile operator when the automobile 114 detects a potential security threat. For example, server 122 may receive, over the Internet 110 from the automobile 118, a message indicating a potential security threat to the automobile 114. In one embodiment, the message may include an automobile ID, as well as the threat ID 502, the threat location 504, the threat type 506, and/or the threat time 510 associated with the detected potential security threat. It is to be appreciated, however, that other appropriate information may be included message from the automobile 114. Server 122 may then look up the received automobile ID in operator information 702 to determine the operator ID 705 associated with the operator of the automobile 114. Server 122 may then determine the alert preferences 712 of the operator using the operator ID 705. Server 122 may then alert the operator according to the alert preferences 712, such as by sending an e-mail to the operator, by sending a text message to the mobile device 112 of the operator, by placing a call to a phone number associated with the operator, and/or by leaving a voicemail for the operator.

Server 122 may also be configured to send an automobile security threat report to law enforcement system 108 over the Internet 110. For example, server 122 may receive a security threat report from automobile 114 over the Internet 110. The report may contain a threat ID 502, a threat location 504, a threat type 506, a threat duration 508, a threat time 510, and/or any security camera video 512, 514 contained in an entry in security threat log 500 corresponding to an identified potential security threat to the automobile 114. Server 122 may look up the received threat location in law enforcement information 724 to identify a law enforcement agency having a location 726 nearest to, or within a certain distance of, the threat location. Server 122 may then retrieve the law enforcement contact information 728 for the identified law enforcement agency. Finally, server 122 may forward the security threat report to the law enforcement agency based on the contact information 728 (e.g., via e-mail, text message, voice message, etc.).

Figure 8:
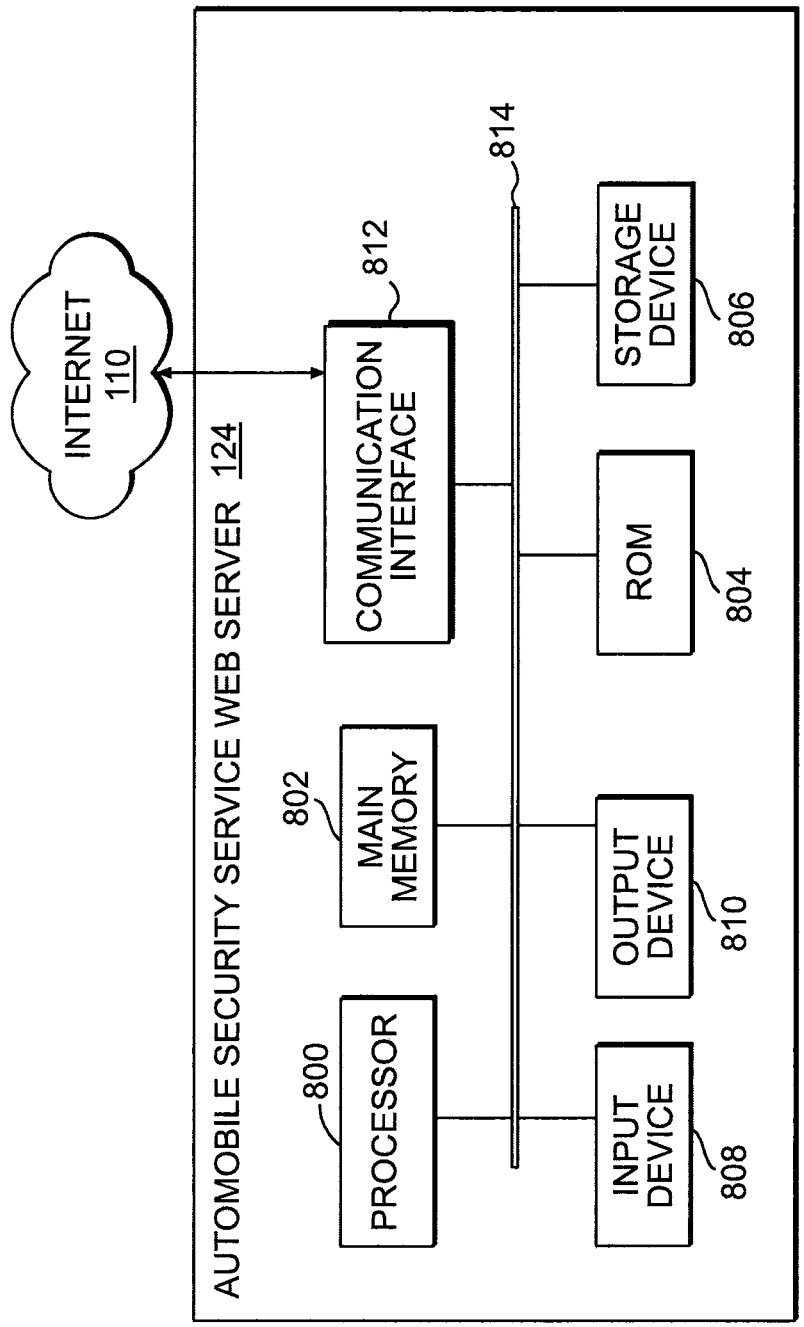
FIG. 8 illustrates an exemplary automobile security service web server, consistent with the disclosed embodiments.

FIG. 8 illustrates an exemplary representation of automobile security service web server 124. Server 124 may have a similar configuration as automobile security service server 122, discussed above. For example, server 124 may include a processor 800, a main memory 802, a read-only memory (ROM) 804, a storage device 806, an input device 808, an output device 810, and a communication interface 812 interconnected via a communications bus 814. Storage device 806 may contain an automobile security monitoring service website, which server 124 may serve to terminal devices of local system 106 in response to access requests received therefrom.

Via the website, server 124 may be configured to receive login information, automobile security command requests, and other input from automobile operators at terminal devices associated with local system 106. Server 124 may also be configured to provide the input to server 122 to carry out the disclosed automobile security monitoring service. In addition, server 124 may be configured to receive data from server 122 for presentation to the automobile operators via the website in connection with the disclosed automobile security monitoring service. An exemplary website page will be discussed in more detail below.

Returning to FIG. 1, local system 106 may include one or more terminal devices 126 connected to a local area network (LAN) 128. In addition, local system 106 may include a LAN gateway 130 which interfaces between LAN 128 and the Internet 110.

Figure 9:
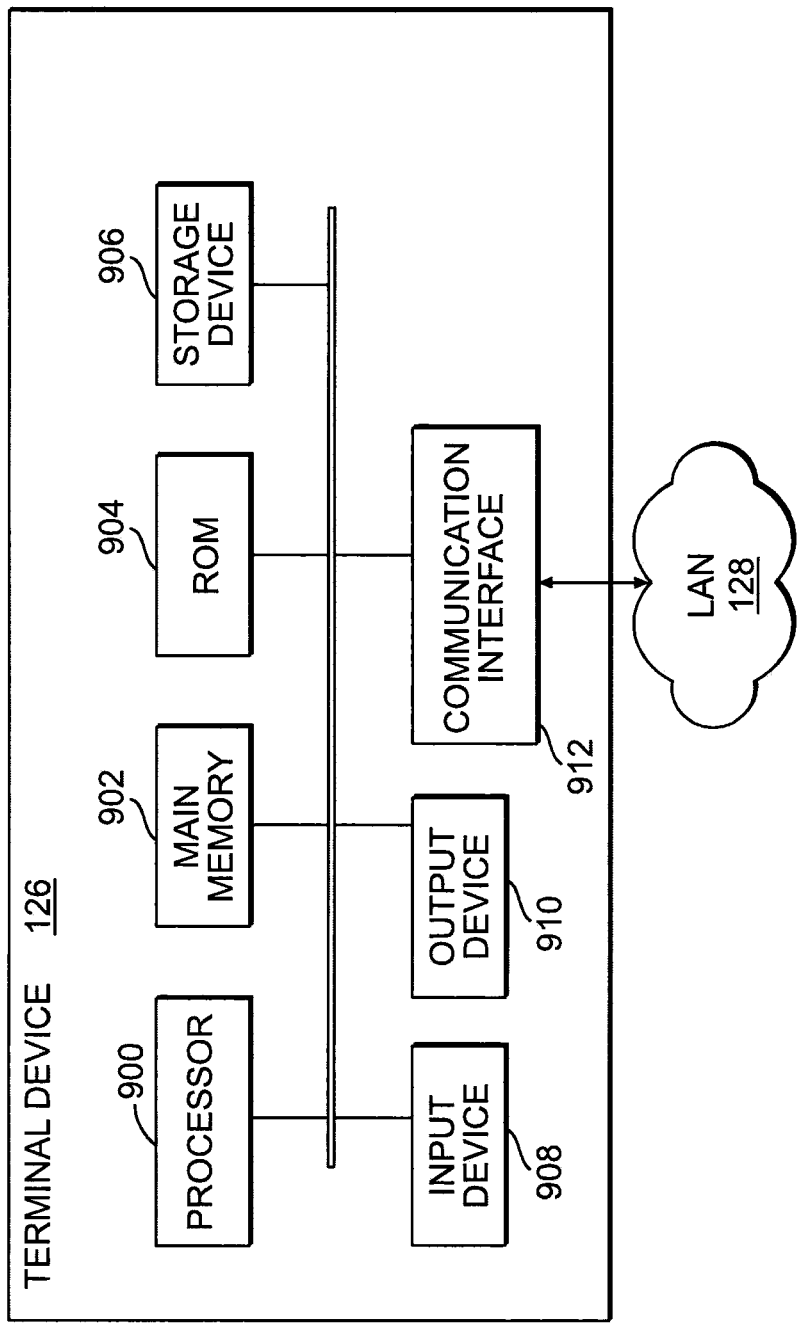
FIG. 9 illustrates an exemplary terminal device, consistent with the disclosed embodiments.

Terminal devices 126 may include a desktop computer, a laptop computer, a tablet PC, a personal digital assistant (PDA), an iPad®, or any other computing device that may connect to LAN 128 to access the Internet 110. In one embodiment, terminal devices 126 may be associated with the operators of automobiles 114. FIG. 9 shows an exemplary representation of terminal device 126. Similar to the other devices discussed above, terminal device 126 may include a processor 900, a main memory 902, a ROM 904, a storage device 906, an input device 908, an output device 910, and a communication interface 912 for communicating on LAN 128.

LAN 128 may include any device or system capable of providing local area connectivity to wired or wireless communication devices, such as terminal devices 126. For example, wireless LAN 128 may operate according to a wireless fidelity (Wi-Fi) protocol such as IEEE 802.11 wireless protocol. LAN gateway 130 may include any device or system capable of connecting LAN 128 to the Internet 110. For example, LAN gateway may include network hardware such as wireless routers, access points, switches, network address translators (NATs), or other network communication devices for providing a wired or wireless link between LAN 128 and the Internet 110.

Law enforcement system 108 may represent computing infrastructure of one or more law enforcement entities (e.g., local police) supporting the disclosed automobile security monitoring service. For example, law enforcement system 108 may include a plurality of law enforcement automobile security servers 132 associated with different police precincts, districts, departments, or jurisdictions in different geographical areas.

Figure 10:
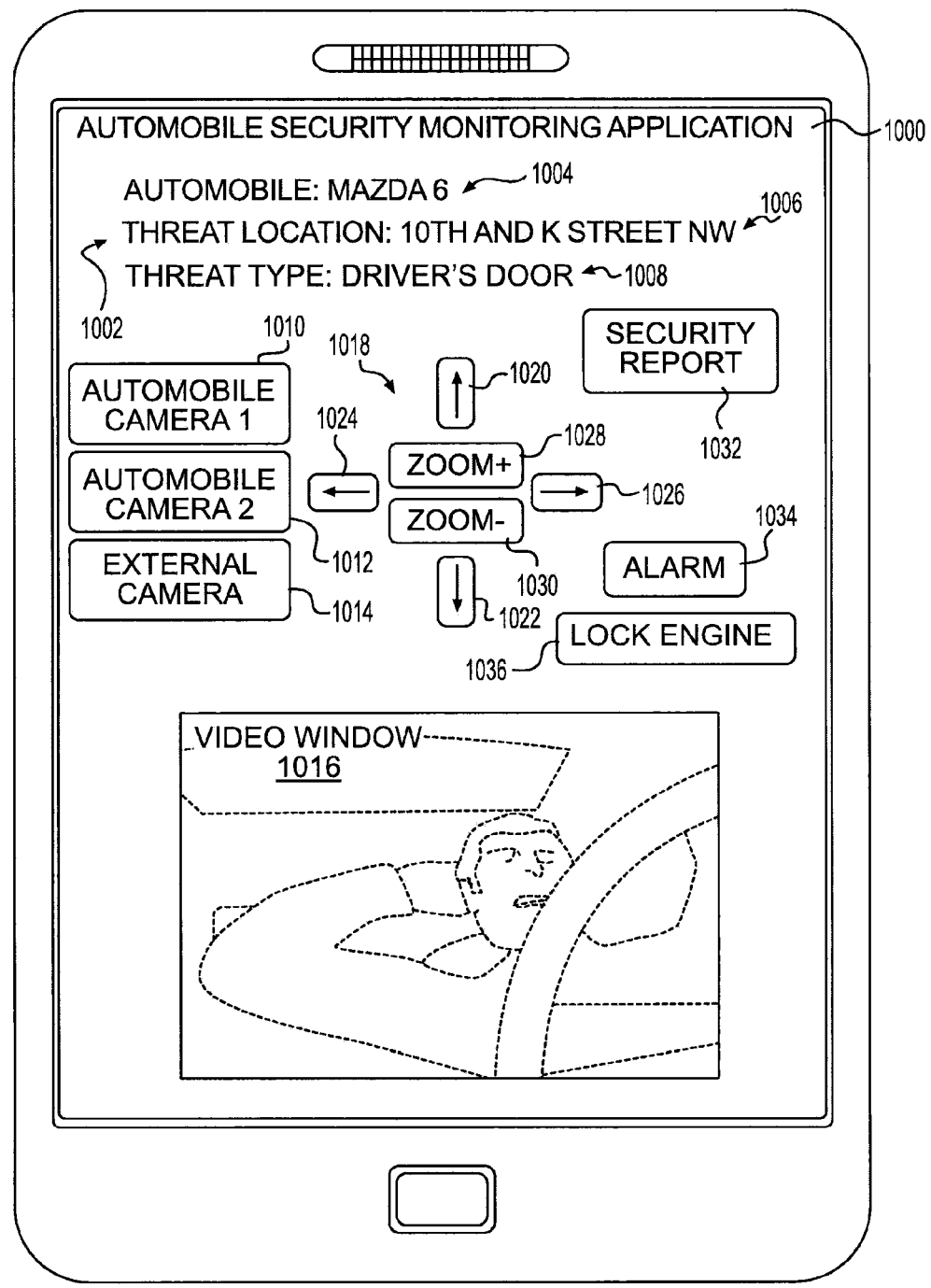
FIG. 10 illustrates an exemplary a page of an automobile security monitoring application, consistent with the disclosed embodiments.

As described above, server 122 may receive a request from the automobile operator to issue an automobile security threat report to law enforcement. In response, server 122 may select a law enforcement entity in the geographical area of the threatened automobile 114, and may send the report via e-mail, text message, or otherwise to a law enforcement automobile security server 132 associated with the selected law enforcement entity. Upon receiving the automobile security threat report, server 132 may notify appropriate law enforcement personnel to investigate the security threat FIG. 10 illustrates an exemplary automobile security monitoring application page 1000. In one embodiment, page 1000 may be part of automobile security monitoring application 302 and displayed to an automobile operator using mobile device 112. In another embodiment, page 1000 may be a web application associated with the website maintained by web server 124, and may execute in a web browser of a mobile device 112 or a terminal device 126.

In one embodiment, the automobile security monitoring application may launch and display page 1000 to the automobile operator when security system control module 408 detects a potential threat to the security of automobile 114. For example, as described above, when the automobile 114 detects a potential security threat and notifies server 112, server 112 may send over the Internet 110 to mobile device 112 a security threat alert message (e.g., a text message) containing the automobile ID associated with the automobile 114, the threat ID 502, the threat location 504, the threat type 506, and/or the threat time 510. In response, mobile device 110 may launch the automobile security monitoring application and display page 1000 via output device 212 to alert the operator of the detected potential security threat. But the operator may also manually access and launch the automobile security monitoring application using mobile device 112 or terminal device 126.

As shown, page 1000 may include an automobile threat information display 1002. Threat information display 1002 may include an automobile name 1004, a threat location 1006, and a threat type 1008 corresponding respectively to the automobile ID, threat location 504, and threat type 506 contained in the received security threat alert message.

Page 1000 may further include one or more automobile security camera user interface (UI) elements, depending upon the number of security cameras 418 onboard automobile 114. In the embodiment shown, page 1000 includes a first automobile security camera UI element 1010 for viewing streaming video from a first security camera 418 onboard automobile 114 and a second security camera UI element 1012 for viewing streaming video from a second security camera 418 onboard automobile 114. Page 1000 may also include an external security camera UI element 1014 for viewing streaming video from a security camera 116 in the vicinity of automobile 114, if any.

When the operator selects automobile security camera UI element 1010 or 1012, such as by providing input to input device 212 (e.g., a touchscreen), system 100 may stream video from the security camera 418 of automobile 114 corresponding to selected automobile security camera UI element 1010 to mobile device 112. For example, mobile device 112 may transmit an automobile streaming video command request to server 122 over cellular network 118. The request may include, for example, an automobile ID identifying the operator's automobile 114, a command ID identifying the selected automobile security camera 418 and/or a streaming video command. Server 122 may then generate a streaming video command and transmit the command to the automobile 112 over the Internet 110, as described above. Upon receiving the streaming video of the selected security camera 418 from automobile 114, server 112 may relay the streaming video to mobile device 112, as described above. Mobile device 112 may then render and display the streaming video in a video window 1016 on page 1000. Similar operations may be performed with respect to the second security camera 418 onboard automobile 114 when second automobile security camera UI element 1012 is selected.

When the operator selects external camera UI element 1014, system 100 may stream video from a security camera 116 in the vicinity of automobile 114. For example, mobile device 112 may communicate a public camera streaming video command to server 122 over cellular network 118. The request may include, for example, an automobile ID identifying the operator's automobile 114 and a command ID identifying the public camera streaming video command. Server 122 may then identify a security camera 116 in the vicinity of the automobile 114, may connect to the identified security camera 116 over the Internet 110 (or cellular network 118), and may receive streaming video from the security camera 116 over the Internet 110 (or cellular network 118) via the connection, as described above. Upon receiving the streaming video from the security camera 116, server 112 may relay the streaming video to mobile device 112, as described above. Mobile device 112 may then render and display the streaming video in video window 1016.

Page 1000 may further include a video control interface 1018. Video control interface 1018 may include, for example, a pan up UI element 1020, a pan down UI element 1022, a pan left UI element 1024, and pan right UI element 1026. Video control interface 1018 may further include a zoom in UI element 1028 and a zoom out UI element 1030.

When the operator selects pan up UI element 1020, pan down UI element 1022, pan left UI element 1024 or pan right UI element 1026, mobile device 112 may respectively send a pan up command request, a pan down command request, and pan left command request, or a pan right command request for the selected security camera 418 onboard automobile 114 to server 122 over cellular network 118. The request may include, for example, an automobile ID identifying the operator's automobile 114 and a command ID identifying the security camera 418 and the particular pan direction. Server 122 may receive the command request over the Internet 110, and may generate and transmit the camera pan command to the automobile 114 the Internet 110, as described above, causing the selected security camera 418 aboard automobile 114 to pan as commanded by the operator. System 100 may similarly cause the selected security camera 418 to zoom in and out when the operator selects zoom in UI element 1028 and zoom out UI element 1030, respectively.

Page 1000 may further include a security report UI element 1032 allowing the operator to submit an automobile security threat report to law enforcement system 108. Specifically, when the operator selects security report UI element 1032, mobile device 112 may send a request to server 122 over cellular network 118 to issue an automobile security threat report to law enforcement system 108. In response, server 122 may request from automobile 114 over the Internet 110 information from automobile security threat log 500, and may generate an automobile security threat report based on the information from the threat log 500, as discussed above. Server 122 may also identify a law enforcement entity in the vicinity of automobile 114, and send the automobile security threat report to that law enforcement entity (e.g., by e-mail), as described above.

Page 1000 may further include an alarm UI element 1034 allowing the operator to activate the alarm device 412 of automobile 114. When the operator selects alarm UI element 1034, mobile device 112 may send an alarm command request to server 122 over cellular network 118. Server 112 may then process the alarm command request and send an alarm command to automobile 114 over the Internet 110, as described above.

Page 1000 may further include a lock engine UI element 1036 allowing the operator to lock off the engine or other power source of automobile 114. When the operator selects lock engine UI element 1036, mobile device 112 may send a lock engine command request to server 122 over cellular network 118. Server 112 may then process the lock engine command request and send a lock engine command to automobile 114 over the Internet 110, as described above.

Although page 1000 is described above primarily as operating on mobile device 112, it is to be appreciated that page 1000 may similarly operate on a terminal device 126 to achieve the same or similar results.

Figure 11:
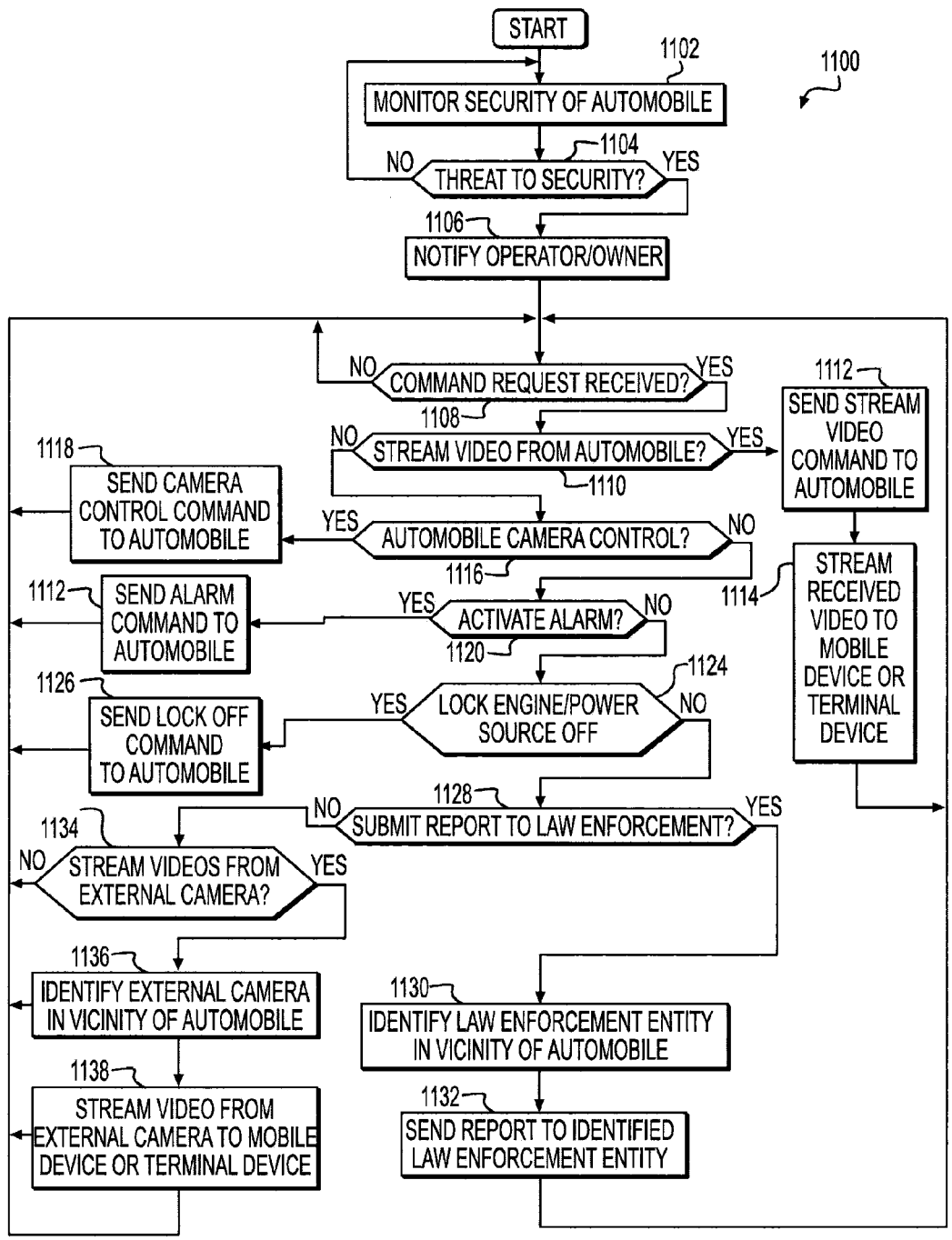
FIG. 11 is a flowchart illustrating an exemplary method for monitoring the security of one or more automobiles, consistent with the disclosed embodiments.

FIG. 11 illustrates a flowchart of an exemplary method 1100 for monitoring the security of automobiles 114, consistent with the disclosed embodiments. In one embodiment, method 1100 may be performed by server 122. For example, processor 600 of server 122, executing instructions stored in memory 602, may perform method 1100.

Server 122 may monitor the security of automobiles 114 over the Internet 110 (step 1102). In one embodiment, server 112 may monitor the security of automobiles 114 having accounts with the disclosed automobile service. For example, server 122 may monitor the Internet 110 for any security threat alert messages transmitted by automobiles 114 on cellular network 118, as described above.

Server 122 may determine whether the security of any monitored automobile 114 is threatened (step 1104). For example, server 122 may determine whether a security threat alert message is received from an automobile 114, such as when automobile 114 detects a potential security threat based on signals from motion detectors 420, door sensors 422, or other sensors of security sensing system 410, as described above. If the security of an automobile 114 is not threatened, method 1100 may return to step 1102.

If the security of an automobile 114 is threatened, server 122 may notify the owner or operator of the automobile 114 (step 1106). For example, server 122 may identify the owner or operator of automobile 114, and may notify the operator of the security threat to the automobile 114 via e-mail, text message, telephone call, voice message, or other appropriate medium, as described above.

Then, server 122 may wait to receive an automobile security command request from the owner or operator over the Internet 110 (step 1108). Specifically, server 122 may wait for the owner or operator to transmit an automobile security command from mobile device 112 onto cellular network 118 or from terminal device 126 onto LAN 128, as described above. If no automobile security command is received, server may continue to wait for an automobile security command from the owner or operator.

If an automobile security command request is received, server 122 may determine the type of the command request. For example, server 122 may determine whether the received command request is a request to stream video from a selected security camera 418 aboard the potentially threatened automobile 114 (step 1110). If so, server 112 may generate and send over the Internet 110 a command to the automobile 114 to stream video from the selected security camera 418 (step 1112), as described above. Then, upon receiving the video stream from the automobile 114 over the Internet 110, server 122 may relay the video stream over the Internet 110 to mobile device 112 or to terminal device 126 for viewing by the owner or operator (step 1114), as described above.

If the received command request is not to stream video from the potentially threatened automobile 114, server 112 may determine whether the request is to control a selected security camera 418 onboard the automobile 114 (step 1116). For example, server 112 may determine whether the owner or operator requests to pan, tilt, or zoom a selected security camera 418, as described above. If so, server 112 may generate and send over the Internet 110 a command to the automobile 114 to pan, tilt, or zoom the selected security camera 418 (step 1118), as described above.

If the received command request is not to control a security camera 418 aboard the potentially threatened automobile 114, server 122 may determine whether the request is to active alarm device 412 of the automobile 114 (step 1120). For example, the owner or operator may have requested to activate a siren or other alarm device 412 of the automobile 114 using UI element 1034 to deter theft. If so, server 122 may generate and send over the Internet 110 a command to the automobile 114 to activate alarm device 412 (step 1122), as described above.

If the received command request is not to activate the alarm device 412 of the potentially threatened automobile 114, server 122 may determine whether the request is to lock the engine or other power source of the automobile 114 in an off state (step 1124). Alternatively or additionally, in step 1124, server 122 may determine whether the request is to activate disabling device 414 to disable another system of automobile. For example, the owner or operator may have requested to lock the engine off or to lock the transmission to "park" to deter theft. If so, server 122 may generate and send over the Internet 110 a command to the automobile 114 to lock the engine or other power source of automobile 114 to an off state, and/or to activate disabling device 414 (step 1126), as described above.

If the received command request is not to lock the engine or other power source of automobile 114 off or to active disabling device 414, server 122 may determine whether the request is to submit an automobile security threat report to a nearby law enforcement entity (step 1128). For example, the owner or operator, after viewing the streaming video from the automobile 114 on mobile device 112 or on terminal device 126, may determine that a thief is attempting to steal automobile 114, and may request to issue a report to law enforcement using UI element 1032. In this case, server 122 may identify a law enforcement entity in the vicinity of the automobile 114 (step 1130), as described above. Server 122 may then send an automobile security threat report to the identified law enforcement entity (step 1132), such as via e-mail, as described above. Accordingly, the law enforcement entity may dispatch officers to the scene of the automobile 114 to investigate the security threat.

If the received command request is not to submit an automobile security threat report, server 122 may determine whether the request is to stream video from a public camera 116 in the vicinity of automobile 114 (step 1134). For example, to obtain a better view of the scene, the owner or operator may select UI element 1014 to view the automobile 114 from the perspective of a nearby public camera 116. If so, server 122 may identify a public camera 116 nearby automobile 114 (step 1136), as described above. Server 122 may then connect to the identified public camera 116 to receive a video stream from the public camera 116 over the Internet 110, and may relay the received video stream over the Internet 110 to mobile device 112 or to terminal device 126 for viewing by the owner or operator (step 1138), as described above.

If the request is not to stream video from a public camera 116, method 1100 may return to step 1108. In certain embodiments, method 1100 may also return to step 1108 upon completion of steps 1114, 1132, and 1138, as shown in FIG. 11.

Although FIG. 11 describes one particular method 1100 for monitoring the security of automobiles 114, other methods are contemplated. For example, in some embodiments, server 122 may, automatically (and immediately) upon receiving a message from automobile 114 of a potential security threat, request or receive streaming video from automobile 114 or from public security cameras 116 and may forward the streaming video to mobile device 112 or to terminal device 126 of the owner. In some embodiments, server 112 may forward the streaming video to the automobile owner along with the alert. Optionally, when alerting the automobile owner of a potential security threat, server 122 may send the current automobile GPS location and/or video clips (e.g., from onboard security cameras 416 and/or from a nearby public security camera 116) to the mobile device 112 or the terminal device 126 of the automobile owner.

In some embodiments, server 122 may also automatically send a security threat report to law enforcement system 108, even in the absence of a request from the automobile owner. For example, upon receiving a message from automobile 114 indicating a potential security threat, depending on the threat type 506 and/or a risk level of the threat, server 122 may automatically send a security threat report to law enforcement system 108 after a threshold amount of time (e.g., 5 minutes) has elapsed without receiving a request to do so from the automobile owner. Server 122 may automatically lock the engine/power source off, activate alarm device 412, and/or activate disabling device 414 in the absence of a request from the automobile operator in a similar fashion. To illustrate, if the threat type 506 in the alert message received by server 122 indicates the driver's door has been opened without authorization (i.e., a "serious" threat), server 122 may automatically send a security threat report to law enforcement system 108, lock the engine/power source off, activate alarm device 412, and/or activate disabling device 414 after 5 minutes if no command request has been received from the automobile owner.

Figure 12:
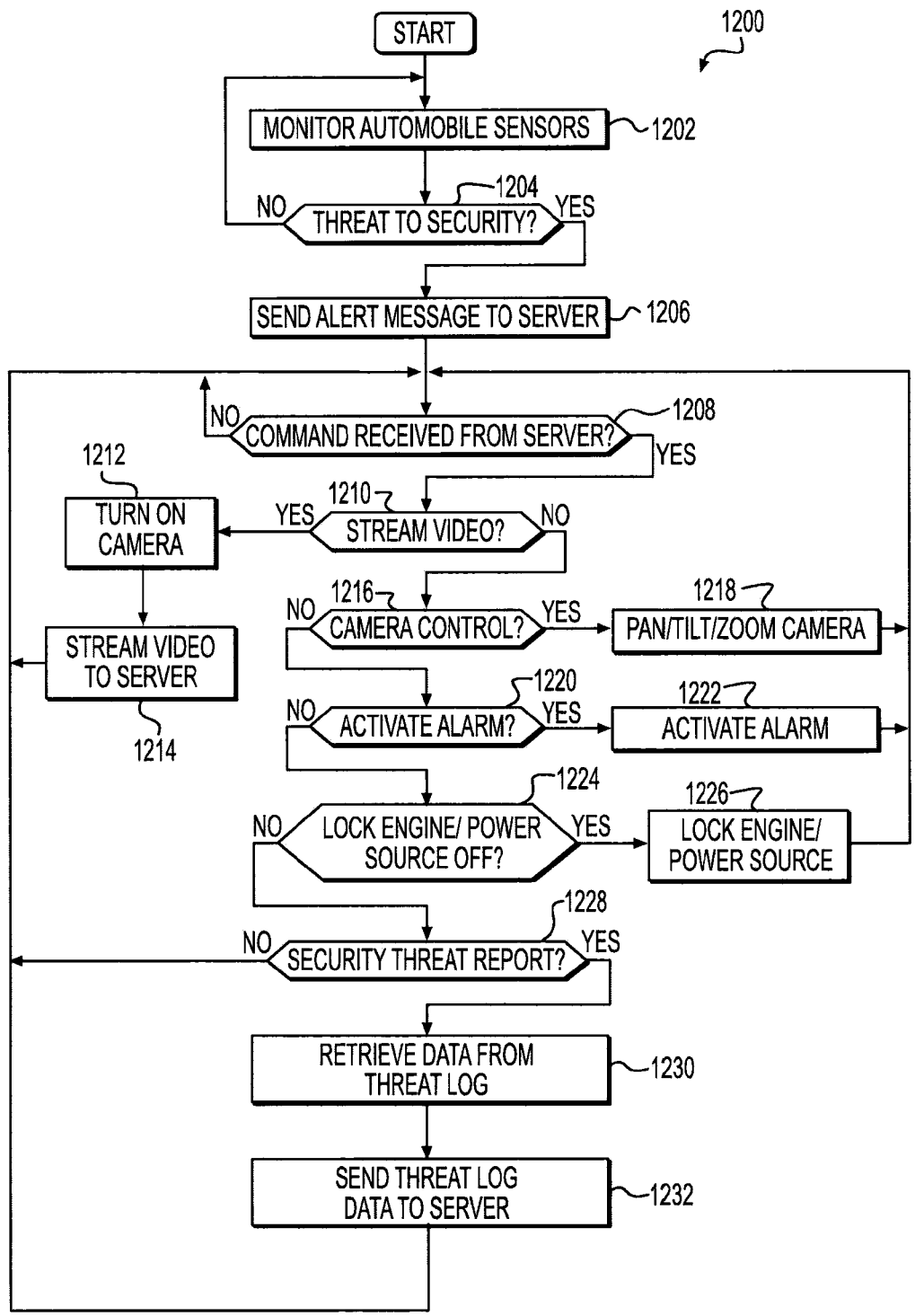
FIG. 12 is a flowchart illustrating an exemplary method for responding to a security threat to an automobile, consistent with the disclosed embodiments.

FIG. 12 illustrates a flowchart of an exemplary method 1200 for responding to a security threat to an automobile 114, consistent with the disclosed embodiments. In one embodiment, method 1200 may be performed by automobile 114. For example, security system control module 408 may interact with other systems or devices aboard automobile 114 to perform method 1200.

Initially, security system control module 408 may monitor automobile security sensor system 410 (step 1202). For example, security system control module 408 may monitor signals from motion detectors 420, door sensors 422, trunk sensor 424, shock sensor 426, and/or operator input device 428, as discussed above.

Security system control module 408 may determine whether the security of automobile 114 is potentially threatened (step 1204). For example, security system control module 408 may determine whether the security of automobile 114 is potentially threatened based on the signals from motion detectors 420, door sensors 422, trunk sensor 424, shock sensor 426, and/or operator input device 428, as discussed above.

If security system control module 408 determines there is a potential threat to the security of automobile 114, security system control module 408 may send a security threat alert message to server 122 (step 1206). For example security system control module 408 may retrieve the threat ID 502, threat location 504, and threat type 506 from automobile security threat log 500 contained in automobile security database 416, generate an alert message containing the retrieved information, and send the alert message to server 122 over cellular network 118, as described above.

Security system control module 408 may then wait to receive an automobile security command from the server 122 over cellular network 118 (step 1208). Specifically, security system control module 408 may wait for server 122 to transmit an automobile command in response to receiving a request from the owner or operator of automobile 114, as described above. Security system control module 408 may receive the command over automobile network 410 from cellular network communication module 402. If no automobile security command is received, security system control module 408 may continue to wait for an automobile security command from server 122.

If an automobile security command is received, security system control module 408 may determine the type of the command request. For example, security system control module 408 may determine whether the received command is a command to stream video from a selected security camera 418 aboard the automobile 114 (step 1210), such as when the owner or operator selects UI element 1010 or 1012. If so, security system control module 408 may turn on the selected security camera 418 and/or control the security camera 418 to begin streaming video (step 1212), as described above. Then, upon receiving the video stream from the security camera 418, security system control module 408 may transmit the video on automobile network 410 to cellular network communication module 402 for streaming onto cellular network 118 (step 1214), as described above.

If the received command is not to stream video from a security camera 418, security system control module 408 may determine whether the command is to control a selected security camera 418 onboard the automobile 114 (step 1216). For example, security system control module 408 may determine whether the owner or operator commanded to pan, tilt, or zoom a selected security camera 418 by providing input to video control interface 1018, as described above. If so, security system control module 408 may control the selected security camera 418 to pan, tilt, or zoom (step 1218), as described above.

If the received command is not to control a security camera 418 aboard automobile 114, security system control module 408 may determine whether the command is to active alarm device 412 of the automobile 114 (step 1220). For example, the owner or operator may have requested, via UI element 1034, to activate a siren or other alarm device 412 of the automobile 114 to deter theft. If so, security system control module 408 may activate alarm device 412 (step 1222).

If the received command is not to activate the alarm device 412 of the automobile 114, security system control module 408 may determine whether the command is to lock the engine or other power source of the automobile 114 in an off state (step 1224). Alternatively or additionally, in step 1124, security system control module 408 may determine whether the command is to activate disabling device 414 to otherwise disable a system of automobile 114. For example, the owner or operator may have requested, via UI element 1036, to lock the engine off or to lock the transmission to "park" to deter theft. If so, security system control module 408 may lock the engine or other power source of automobile 114 to an off state, and/or activate disabling device 414 (step 1226), as described above.

If the received command request is not to lock the engine or other power source of automobile 114 off or to active disabling device 414, security system control module 408 may determine whether the command is to submit an automobile security threat report to a nearby law enforcement entity (step 1228). For example, the owner or operator, after viewing the streaming video from the automobile 114 on mobile device 112 or on terminal device 126, may determine that a thief is attempting to steal automobile 114, and may request to issue a report to law enforcement using UI element 1032. In this case, security system control module 408 may retrieve information relating to the detected potential security threat from security log 500 (step 1230). For example, security system control module 408 may access security database 416 to retrieve the threat ID 502, threat location 504, threat type 506, threat duration 508, threat time 510, and/or security camera video 512, 514 associated with the detected potential security threat. In addition, security system control module 408 may provide the retrieved threat information to cellular network communication module 402, which may transmit the threat information over cellular network 118 to server 122 for generation of the security threat report (step 1232).

If the command is not to submit a security threat report to law enforcement, method 1200 may return to step 1208. In certain embodiments, method 1200 may also return to step 1208 upon completion of steps 1214, 1218, 1122, and 1226.

One of ordinary skill in the art will appreciate that computer programs for implementing the disclosure may be stored on and/or read from computer-readable storage media. The computer-readable storage media may have stored thereon computer-executable instructions which, when executed by a computer processor, cause the computer to perform, among other things, processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of system 100 (FIG. 1).

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited by examples described in the present specification or during the prosecution of the application. Further, the steps or processes of the disclosure may be modified in any manner, including by reordering steps, inserting steps, deleting steps, or having steps or functions performed by other entities of system 100 (e.g., mobile device 112, automobiles 114, servers 122 and 122, and/or terminal device 126), without departing from the principles of the disclosure.

It is intended, therefore, that the specification and examples be considered as exemplary only, with a true scope and spirit of the disclosure being indicated by the following claims and their full scope of equivalents.

What is claimed is:

1. A method for monitoring the security of a plurality of automobiles, comprising:
   monitoring, by an automobile security service system including one or more servers, over a network, the security of the plurality of automobiles;
   receiving, at the automobile security service system from one of the plurality of automobiles over the network, a message indicating a potential security threat to the automobile, the message including a location of the automobile and threat type information determined from one or more sensors onboard the automobile that triggered the potential security threat;
   sending, by the automobile security service system over the network to a terminal device associated with an owner of the automobile, an alert indicating the potential security threat to the automobile;
   receiving, by the automobile security service system from the automobile over the network and responsive to the potential security threat, video from the security camera onboard the automobile;
   generating, by the automobile security service system, an automobile security threat report that includes: the location of the automobile, the received video from the security camera onboard the vehicle, and the threat type information determined from the one or more sensors onboard the automobile that triggered the potential security threat;
   sending, by the automobile security service system over the network, the automobile security threat report to a server associated with a law enforcement entity;
   receiving, from the terminal device over the network, a request to stream video from a public security camera near the automobile;
   identifying, based on the location of the automobile, an Internet Protocol (IP) address of a public security camera near the automobile;
   connecting to the identified IP address of the public security camera to receive streaming video from the public security camera over the network; and
   streaming, over the network, the received video to the terminal device.

2. The method of claim 1, wherein the network includes a packet-switched network.

3. The method of claim 1, further including:
   receiving, from the terminal device over the network, a request to control a selected security camera onboard the automobile to pan, tilt, or zoom; and
   issuing, to the automobile over the network and based on the request, a command to control the selected security camera to pan, tilt, or zoom.

4. The method of claim 1, further including:
   receiving, from the terminal device over the network, a request to lock a power source of the automobile off or a request to activate an alarm device of the automobile; and
   issuing, to the automobile over the network and based on the request, a command to the automobile to lock the power source off or a command to activate the alarm device of the automobile.

5. The method of claim 1, wherein:
   generating an automobile security threat report includes receiving, from the terminal device over the network, a request to send an automobile security threat report to a law enforcement entity;
   identifying, based on the location of the automobile, a law enforcement entity near the automobile among a plurality of law enforcement entities; and
   sending the automobile security threat report includes sending, over the network, the generated automobile security threat report to the identified law enforcement entity.

6. The method of claim 1, further comprising:
   receiving, over the network from the terminal device and responsive to the alert, a request to stream video from a security camera onboard the automobile; and
   issuing, to the automobile over the network and based on the request, a command to the automobile to stream video from the security camera onboard the automobile,
   wherein receiving the request includes receiving input via an automobile security monitoring application executing on the terminal device or an automobile security monitoring web page, the application or web page including at least one graphical user interface element corresponding to the request.

7. The method of claim 1, wherein the terminal device includes a mobile device.

8. A system for monitoring the security of a plurality of automobiles over a network, comprising:
   a memory;
   a communication unit configed to connext the system to the plurality of automobiles over the network; and
   one or more processors configured to:
      monitor, over the network, the security of the plurality of automobiles;
      receive, from one of the plurality of automobiles over the network, a message indicating a potential security threat to the automobile, the message including a location of the automobile and threat type information determined from one or more sensors onboard the automobile that triggered the potential security threat;
      send, over the network to a terminal device associated with an owner of the automobile, an alert indicating the potential security threat to the automobile;
      receive, over the network and responsive to the potential security threat, video from the security camera onboard the automobile;
      generate an automobile security threat report that includes: the location of the automobile, the received video from the security camera onboard the vehicle, and the threat type information determined from the one or more sensors onboard the automobile that triggered the potential security threat;
      send, over the network, the automobile security threat report to a server associated with a law enforcement entity;
      receive, over the network, a request to stream video from a public security camera near the automobile;
      identify, based on the location of the automobile, an Internet Protocol (IP) address of a public security camera near the automobile;
      connect to the identified IP address of the public security camera to receive streaming video from the public security camera over the network; and
      stream, over the network, the received video to the terminal device.

9. The system of claim 8, wherein the network includes a packet- switched network.

10. The system of claim 8, the one or more processors being further configured to:

receive, over the network, a request to control a selected security camera onboard the automobile to pan, tilt, or zoom; and issue, to the automobile over the network and based on the request, a command to control the selected security camera to pan, tilt, or zoom.

11. The system of claim 8, the one or more processors being further configured to:

receive, from the terminal device over the network, a request to lock a power source of the automobile off or a request to activate an alarm device of the automobile; and issue, to the automobile over the network and based on the request, a command to the automobile to lock the power source off or a command to activate the alarm device of the automobile.

12. The system of claim 8, wherein, to generate an automobile security threat report, the one or more processors are further configured to:

receive, from the terminal device over the network, a request to send an automobile security threat report to a law enforcement entity;

identify, based on the location of the automobile, a law enforcement entity near the automobile among a plurality of law enforcement entities; and send, over, the automobile security threat report to the identified law enforcement entity.

13. The system of claim 8, the one or more processors being further configured to:

receive, over the network from the terminal device and responsive to the alert, a request to stream video from a security camera onboard the automobile; and issue, to the automobile over the network and based on the request, a command to the automobile to stream video from the security camera onboard the automobile, wherein receiving the request includes receiving input via an automobile security monitoring application executing on the terminal device or an automobile security monitoring web page, the application or web page including at least one graphical user interface element corresponding to the request.

14. The system of claim 8, wherein the terminal device includes a mobile device.

\* \* \* \* \*